United States Patent
Murase et al.

(10) Patent No.: US 8,436,944 B2
(45) Date of Patent: May 7, 2013

(54) WIRELESS COMMUNICATIONS SYSTEM, ADAPTOR APPARATUS FOR VIDEO APPARATUS, VIDEO APPARATUS AND CONTROL METHOD FOR WIRELESS COMMUNICATIONS SYSTEM

(75) Inventors: Koichi Murase, Osaka (JP); Makoto Funabiki, Osaka (JP); Keiichiro Obayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 13 days.

(21) Appl. No.: 13/146,449

(22) PCT Filed: Sep. 29, 2010

(86) PCT No.: PCT/JP2010/005853
§ 371 (c)(1),
(2), (4) Date: Jul. 27, 2011

(87) PCT Pub. No.: WO2011/040007
PCT Pub. Date: Apr. 7, 2011

(65) Prior Publication Data
US 2011/0285917 A1 Nov. 24, 2011

(30) Foreign Application Priority Data
Oct. 1, 2009 (JP) .................................. 2009-229430

(51) Int. Cl.
*H04N 5/38* (2006.01)
(52) U.S. Cl.
USPC ........................................................ 348/723
(58) Field of Classification Search .................. 348/723, 348/725, 552, 553; 725/81, 128; 375/295, 375/259; 455/137, 140
See application file for complete search history.

(56) References Cited

U.S. PATENT DOCUMENTS 6,069,929 A * 5/2000 Yabe et al. ..................... 375/368
6,078,631 A * 6/2000 Yabe et al. ..................... 340/7.34

(Continued)

FOREIGN PATENT DOCUMENTS

| JP | 2005-109703 | 4/2005 |
| JP | 2008-022560 | 1/2008 |

(Continued)

OTHER PUBLICATIONS

International Search Report issued Nov. 2, 2010 in International (PCT) Application No. PCT/JP2010/005853.

(Continued)

*Primary Examiner* — Paulos M Natnael
(74) *Attorney, Agent, or Firm* — Wenderoth, Lind & Ponack, LLP.

(57) ABSTRACT

In a wireless communication adapter device, in order to reduce connection time to a destination when another sink device is selected as the destination, a control unit included in the wireless communications adaptor device determines whether a device ID of an adapter device for a sink device and EDID information corresponding to the device ID are registered in an EDID managing table. The device ID and the EDID information are obtained through authentication processing with the adapter device for the sink device. When the device ID is registered, the control unit copies the EDID information corresponding to the device ID to the EDID table. When the device ID is not registered, the control unit obtains the EDID information from the authenticated adapter device for the sink device, associates the EDID information with the device ID, and stores the EDID information and the device ID in the EDID managing table.

19 Claims, 13 Drawing Sheets

U.S. PATENT DOCUMENTS

| | | | |
|---|---|---|---|
| 6,882,868 B1* | 4/2005 | Shattil | 455/562.1 |
| 7,596,359 B2* | 9/2009 | Kimoto et al. | 455/137 |
| 7,620,713 B2* | 11/2009 | Tokuhashi et al. | 709/224 |
| 8,175,187 B2* | 5/2012 | Kogawa et al. | 375/295 |
| 2005/0068346 A1 | 3/2005 | Ogawa et al. | |
| 2005/0183115 A1* | 8/2005 | Maruyama et al. | 725/38 |
| 2006/0072142 A1* | 4/2006 | Shiraishi | 358/1.14 |
| 2006/0128337 A1* | 6/2006 | Fujita et al. | 455/277.1 |
| 2009/0015655 A1* | 1/2009 | Yanagisawa | 348/14.02 |
| 2009/0322948 A1 | 12/2009 | Funabiki et al. | |
| 2010/0029236 A1* | 2/2010 | Kimoto et al. | 455/226.2 |
| 2010/0165912 A1 | 7/2010 | Funabiki et al. | |
| 2010/0188566 A1 | 7/2010 | Oku | |
| 2012/0047538 A1* | 2/2012 | Murase et al. | 725/81 |
| 2012/0236949 A1* | 9/2012 | Keating et al. | 375/259 |

FOREIGN PATENT DOCUMENTS

| | | |
|---|---|---|
| JP | 2008-153827 | 7/2008 |
| WO | 2007/094347 | 8/2007 |
| WO | 2008/069050 | 6/2008 |

OTHER PUBLICATIONS

High-Definition Multimedia Interface Specification, Version 1.1, HDMI Licensing, LLC, California in U.S.A., May 20, 2004.

\* cited by examiner

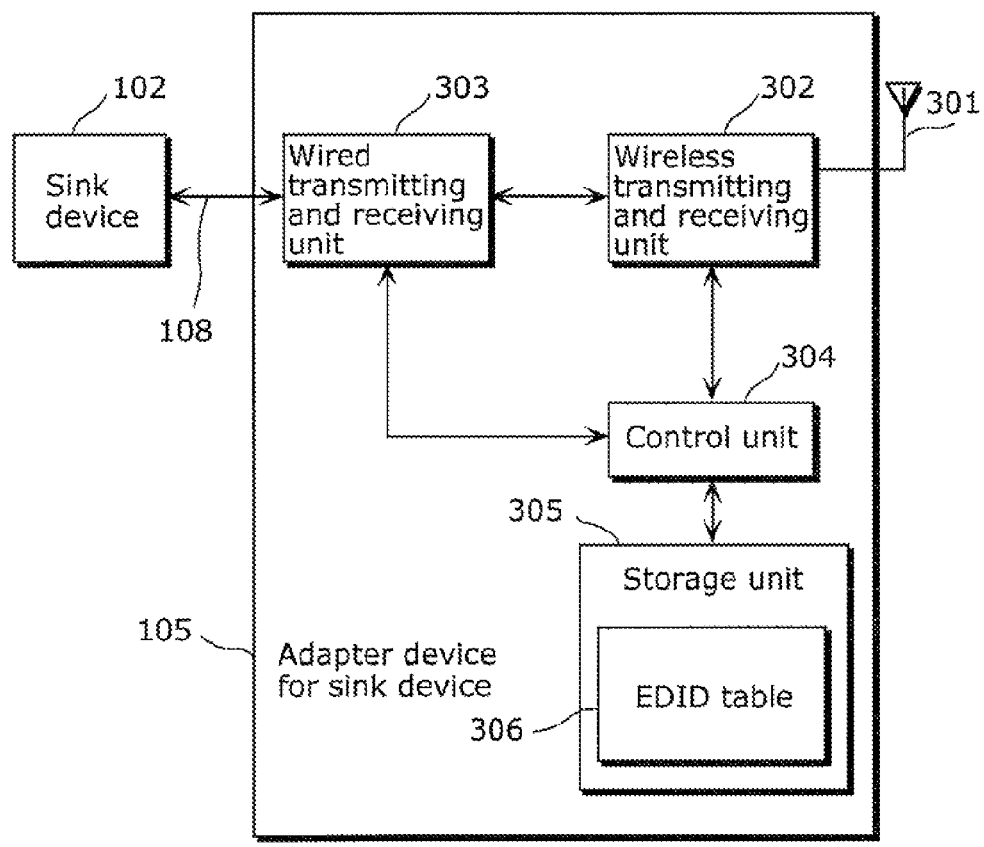

FIG. 10

| Item | |
|---|---|
| Image size | 720 × 480 |
| Scanning technique | Progressive scanning |
| Horizontal synchronous frequency | 31.5kHz |
| Vertical synchronous frequency | 60Hz |
| Pixel frequency | 27MHz |
| Color space information | RGB 4:4:4 |
| Sampling size | 24 bits |
| ⋮ | |

908

WIRELESS COMMUNICATIONS SYSTEM, ADAPTOR APPARATUS FOR VIDEO APPARATUS, VIDEO APPARATUS AND CONTROL METHOD FOR WIRELESS COMMUNICATIONS SYSTEM

TECHNICAL FIELD

The present invention relates to wireless communications systems which wirelessly transmit and receive a video signal according to the High-Definition Multimedia Interface (HDMI) standard and, in particular, to a wireless communications system and an adaptor device for a video device which are capable of relaying and transmitting setting information of a display unit, and a control method of the wireless communications system.

BACKGROUND ART

Patent Reference 1 discloses a transmission system which relays and transmits Extended Display Identification Data (EDID) information wirelessly according to the HDMI.

FIG. 15 is a block diagram showing a structure of a conventional wireless communications system. The conventional wireless communications system includes a source device 1501, a sink device 1504, an adaptor device for the source device 1502, and an adapter device for the sink device 1503.

First, a control unit 1514 in the adapter device for the sink device 1503 reads an EDID table 1520 from a storage unit 1519, and stores the EDID table 1520 on an EDID table 1516 in a storage unit 1515 via a wired transmitting and receiving unit 1513, a cable C2, a wired transmitting and receiving unit 1517, and a control unit 1518.

The source device 1501 wirelessly transmits an authentication requesting signal to the sink device 1504 via a cable C1, a wired transmitting and receiving unit 1505, a wireless transmitting and receiving unit 1506, and an antenna 1510. Upon executing the authentication in response to the authentication requesting signal received via an antenna 1511, a wireless transmitting and receiving unit 1512, the wired transmitting and receiving unit 1513, and the cable C2, the sink device 1504 wirelessly transmits an authentication responding signal to the source device 1501 via the cable C2 and the adapter device for the sink device 1503. Upon receiving the authentication responding signal via the antenna 1510, the wireless transmitting and receiving unit 1506, the wired transmitting and receiving unit 1505, and the cable C1, the source device 1501 wirelessly transmits an EDID requesting signal to the sink device 1504 via the cable C1 and the adapter device for the source device 1502.

The control unit 1514 in the adapter device for the sink device 1503 generates an EDID responding signal in response to the EDID requesting signal via the antenna 1511 and the wireless transmitting and receiving unit 1512, and wirelessly transmits the generated EDID signal to the source device 1501. Here the EDID responding signal includes EDID information stored in the EDID table 1516 recorded on the storage unit 1515.

A control unit 1507 in the adapter device for the source device 1502 receives the EDID responding signal via the antenna 1510 and the wireless transmitting and receiving unit 1506, and stores the EDID information in an EDID table 1509 included in a storage unit 1508.

The source device 1501 wirelessly transmits a connection completion notifying signal to the sink device 1504 via the cable C1, the wired transmitting and receiving unit 1505, the wireless transmitting and receiving unit 1506, and the antenna 1510. Upon receiving the connection completion notifying signal via the adapter device for the sink device 1503 and the cable C2, the sink device 1504 wirelessly transmits the connection completion notifying signal to the source device 1501 via the cable C2 and the adapter device for the sink device 1503.

When the wireless connection is established as described above, the sink device 1504 wirelessly transmits a device designating signal via the cable C2 and the adapter device for the sink device 1503 in order to select the source device 1501 as a communications partner. Upon receiving the device designating signal via the adapter device for the source device 1502 and the cable C1, the source device 1501 wirelessly transmits an ACK signal to the sink device 1504 in response to the device designating signal. Then audio and visual (AV) data is started to be transmitted between the sink device 1504 and the source device 1501 via the adapter device for the source device 1502 and the adapter device for the sink device 1503.

As described above, the conventional wireless communications system disclosed in Patent Literature 1 allows the sink device 1504 and the source device 1501, both of which only include wired interfaces, to transmit and receive the EDID information via a wireless line since the adapter device for the sink device 1503 and the adapter device for the source device 1502 are respectively attached to the sink device 1504 and the source device 1501.

CITATION LIST

Patent Literature

Japanese Unexamined Patent Application Publication No. 2008-022560

Non Patent Literature

High-Definition Multimedia Interface Specification, Version 1.1, HDMI Licensing, LLC, California in U.S. High-Definition Multimedia Interface Specification, Version 1.1, HDMI Licensing, LLC, California in U.S.A., May 20, 2004.

SUMMARY OF INVENTION

Technical Problem

When the source device selects any one of sink devices as a destination, and switches from a source device to the selected one in the wireless communications system disclosed in Patent Literature 1, the wireless communications system needs to obtain the EDID information of the destination every time the source devices are switched.

The present invention is conceived in view of the above problem and has as an object to provide a wireless communications adaptor device which can reduce the connection time to the destination when another sink device is selected as the destination.

Solution to Problem

A wireless communications system according to an implementation of the present invention includes: a first video device which provides a video signal; an adapter device, for the first video device, which is connected to the first video device and wirelessly transmits the video signal; a second video device; and an adapter device, for the second video device, which (i) receives the wirelessly-transmitted video signal, and (ii) provides the received video signal to the second video device, wherein the adapter device for the first video device includes: a first storage unit; a wireless transmitting and receiving unit; and a first control unit, when the first control unit wirelessly transmits the video signal to the second video device, the first control unit, (i) in the case where first setting information is stored in the first storage unit, (a) obtains the first setting information from the first storage unit, (b) transmits the obtained first setting information to the first video device, (c) receives from the first video device a video signal which is compliant with the first setting information, and (d) causes the wireless transmitting and receiving unit to wirelessly transmit the received video signal, the first setting information indicating specifications of video displayable on the second video device, and (ii) in the case where first setting information is not stored in the first storage unit, (a) obtains the first setting information from the adapter device for the second video device, (b) transmits the obtained first setting information to the first video device, (c) receives from the first video device a video signal which is compliant with the first setting information, and (d) causes the wireless transmitting and receiving unit to wirelessly transmit the received video signal, and (e) stores the first setting information in the first storage unit, and the adapter device for the second video device includes: a wireless transmitting and receiving unit; and a second control unit wirelessly transmits, to the adapter device for the first video device, the first setting information being obtained from the second video device.

According to this structure, the adapter device for the first video device (the source device) can associate (i) a history of setting information of the second video device (the sink device) which has wirelessly transmitted the video signal with (ii) identification information uniquely corresponding to the second video device, and store the associated history and identification information in the storage unit. Hence, when the adapter device for the first video device re-transmits the video signal to the second video device which the adapter device for the first video device has once wirelessly transmitted the video signal, the adapter device for the first video device can refer to the storage unit included therein and obtain the setting information. As a result, the process of obtaining the setting information can be omitted, which contributes to reducing the switching time of the second video device.

Preferably, the wireless communications system further includes a third video device; and an adapter device, for the third video device, which receives the video signal and causes the third video device to display the received video signal wherein the adapter device for the first video device and the adapter device for the second video device are connected to each other via a first wireless channel for transmitting and receiving the video signal, the adapter device for the first video device and the adapter device for the third video device are connected to each other via a second wireless channel having a slower transmission speed than the first channel has, the adapter device for the third video device includes: a wireless transmitting and receiving unit; and a third control unit which (i) detects that the third control unit and the third video device are re-connected after the third control unit has been disconnected from the third video device, (ii) obtains second setting information from the third video device, and (iii) wirelessly transmits a control signal to the adapter device for the first video device via the second wireless channel, the second setting information indicating specifications of video displayable on the third video device, and the control signal including the obtained second setting information and identification information which uniquely corresponds to the third video device, and upon receiving the control signal, the first control unit stores the identification information and the second setting information in the first storage unit in association with each other.

Preferably, the third control unit wirelessly transmits the control signal to the adapter device for the first video device via the second wireless channel while the first control unit is wirelessly transmitting the video signal to the adapter device for the second video device via the first wireless channel.

According to the structure, when the adapter device for the third video device (the sink device) detects whether or not the adapter device for the third video device has been disconnected from the third video device has been disconnected and re-connected, the adapter device for the third video device obtains again the setting information of the third video device. Hence, even though the adapter device for said third video device is connected to the third video device having setting information different from setting information before the reconnection, the adapter device for said third video device can obtain the setting information of the latest third video device connected to the adapter device for said third video device itself.

Moreover, while the adapter device for said second video device is receiving the video signal from the adapter device for said first video device via a first wireless channel providing high-speed communications, the adapter device for said third video device transmits the latest setting information of the third video device to the adapter device for said first video device via a second wireless channel providing low-speed communications. As a result, the adapter device for said first video device can update the setting information which corresponds to the third video device and is stored in the storage unit of the adapter device for said first video device itself. Hence the setting information of the currently-disconnected sink device is updated while the transmitting and receiving processing of the video signal is executed. This contributes to reducing the switching time when the sink device is switched from the second video device to the third video device.

It is noted that the identification information may be uniquely assigned to the adapter device for the third video device.

It is noted that the identification information is uniquely assigned to the third video device.

A wireless communications system according to another implementation of the present invention includes: a first video device which wirelessly transmits a video signal; and a second video device which receives the wirelessly-transmitted video signal, and displays the received video signal, wherein the first video device includes: a first storage unit; a wireless transmitting and receiving unit; and a first control unit, when the first control unit wirelessly transmits the video signal to the second video device, the first control unit, (i) in the case where first setting information is stored in the first storage unit, (a) obtains the first setting information from the first storage unit, and (b) causes the wireless transmitting and receiving unit to wirelessly transmit a video signal which is compliant with the obtained first setting information, the first setting information indicating specifications of video displayable on the second video device, and (ii) in the case where first setting information is not stored in the first storage unit, (a) obtains the first setting information from the second video device, (b) causes the wireless transmitting and receiving unit to wirelessly transmit a video signal which is compliant with the obtained first setting information, and (c) stores the first setting information, in the first storage unit, and the second video device includes: a wireless transmitting and receiving unit; and a second control unit wirelessly transmits, to the first video device, the first setting information.

According to this structure, the video device includes a device equivalent to the adapter device, eliminating the need for connecting an extra adapter device. This contributes to reducing the switching time, as well as downsizing and lowering the cost of the video device.

In addition, the adapter device for the second video device may further include: a dummy signal generating unit which generates a dummy signal which is a dummy video signal having a format corresponding to a format of the video signal; and a second storage unit, wherein the second control unit may (i) store format information, in the second storage unit, which specifies a format of the video signal received by the wireless transmitting and receiving unit, (ii) determine whether or not the wireless transmitting and receiving unit is receiving the video signal, (iii) cause the dummy signal generating unit to generate a dummy signal having the format specified with the format information stored in the second storage unit in the case where the wireless transmitting and receiving unit is not receiving the video signal, and (iv) provide the generated dummy signal to the second video device.

A wireless communications system according to another implementation of the present invention includes: a first video device which provides a video signal; an adapter device, for the first video device, which is connected to the first video device and wirelessly transmits the video signal; a second video device; and an adapter device, for the second video device, which (i) receives the wirelessly-transmitted video signal, and (ii) provides the received video signal to the second video device, wherein the adapter device for the second video device includes: a wireless transmitting and receiving unit; a dummy signal generating unit which generates a dummy signal which is a dummy video signal having a format corresponding to a format of the video signal; a first storage unit; and a first control unit which (i) stores format information, in the first storage unit, which specifies a format of the video signal received by the wireless transmitting and receiving unit, (ii) determines whether or not the wireless transmitting and receiving unit is receiving the video signal, (iii) causes the dummy signal generating unit to generate a dummy signal having the format specified with the format information stored in the first storage unit in the case where the wireless transmitting and receiving unit is not receiving the video signal, and (iv) provides the generated dummy signal to the second video device.

According to this structure, in the case where the video signal to be wirelessly transmitted from the adapter device for the first video device stops, the adapter device for the second video device (i) generates the dummy signal having the format information corresponding to the format information of the video signal which the adapter device for the second video device has received, and (ii) provides the dummy signal to the second video device. Usually, the synchronization between the second video device and the adapter device for the second video device is terminated because the video signal from the adapter device for the first video device stops. This structure, however, allows the synchronization to be continued, using the dummy signal. Hence, in the case where the adapter device for the second video device receives the video signal from the adapter device for the first video device, the adapter device for the second video device can provide the video signal to the second video device, eliminating the need for synchronizing therebetween again. In other words, the switching time of the sink device is successfully reduced.

A wireless communications system according to another implementation of the present invention includes: a first video device which wirelessly transmits a video signal; and a second video device which receives the wirelessly-transmitted video signal, and displays the received video signal, wherein the second video device includes: a wireless transmitting and receiving unit; a dummy signal generating unit which generates a dummy signal which is a dummy video signal having a format corresponding to a format of the video signal; a first storage unit; and a first control unit which (i) stores format information, in the first storage unit, which specifies a format of the video signal received by the wireless transmitting and receiving unit, (ii) determines whether or not the wireless transmitting and receiving unit is receiving the video signal, (iii) causes the dummy signal generating unit to generate a dummy signal having the format specified with the format information stored in the first storage unit in the case where the wireless transmitting and receiving unit is not receiving the video signal, and (iv) provides the generated dummy signal to the second video device.

According to this structure, the video device includes a device equivalent to the adapter device, eliminating the need for connecting an extra adapter device. This contributes to reducing the switching time, as well as downsizing and lowering the cost of the wireless communications system.

Instead of the wireless communications system and an adapter device for a video device, the present invention may be implemented in a form of (i) a wireless communications system control method including, as steps, characteristic units which the wireless communications system has, and (ii) a program product causing a computer to execute such characteristic steps. As a matter of course, such a program may be distributed via storage media such as a compact disc read only memory (CD-ROM) and transmission media such as the Internet.

Furthermore, the present invention may be introduced in a form of a Large Scale Integrated circuit (LSI) implementing some or all of the functions of the wireless communications system and the adapter device for the video device.

Advantageous Effects of Invention

As described above, a wireless communications device in the present invention eliminates the need for repeatedly obtaining EDID information on an appliance which has been wirelessly connected once. This contributes to the reduction of switching time when wirelessly connected destinations are switched.

BRIEF DESCRIPTION OF DRAWINGS

FIG. 3 is a block diagram exemplifying an adaptor device for a sink device according to Embodiment 1 of the present invention.

FIG. 4 is a table exemplifying an EDID managing table in the present invention.

FIG. 10 exemplifies a format information table according to Embodiment 2 of the present invention.

DESCRIPTION OF EMBODIMENTS

Described hereinafter are Embodiments of the present invention, with reference to the drawings.

Embodiment 1

Figure 1:
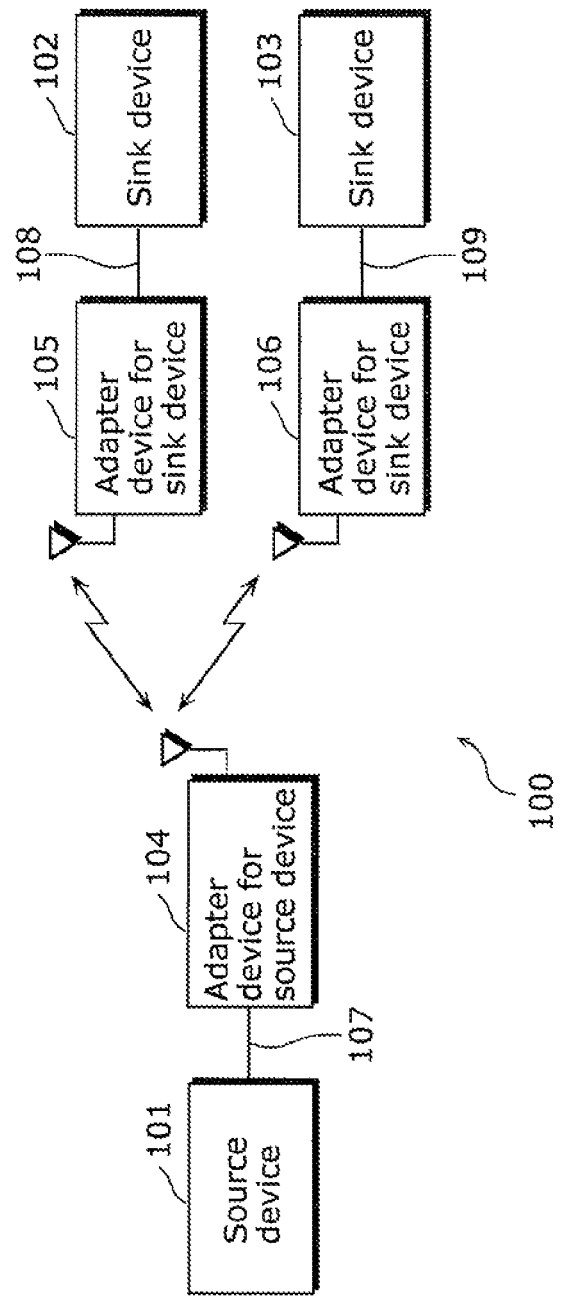
FIG. 1 is a block diagram exemplifying a wireless communications system according to Embodiment 1 of the present invention.

FIG. 1 is a block diagram showing a structure of a wireless communications system 100 according to Embodiment 1 of the present invention.

As shown in FIG. 1, the wireless communications system 100 according to Embodiment 1 includes a source device 101 such as a Digital Versatile Disc (DVD), sink devices 102 and 103 such as a television (TV), an adapter device for the source device 104, an adapter device for the sink device 105, and an adapter device for the sink device 106.

FIG. 1 exemplifies the case where one source device 101, and two sink devices 102 and 103 exchange wireless communications; however, the number of source devices and sink devices shall not be limited to these.

For example, the wireless communications may be held between one source device and three or more sink devices or between two or more source devices and two or more sink devices. Moreover, two or more source devices and sink devices may be connected to each of the adapter device for the source device and the adapter device for the sink device.

The source device 101, and the sink devices 102 and 103 form a device including only a conventional HDMI-based wired interface. The adapter device for the source device 104, the adapter device for the sink device 105, and the adapter device for the sink device 106 form a device including a wireless interface and a conventional HDMI-based wired interface.

The source device 101 connects to the adapter device for the source device 104 via a cable 107. The adapter device for the sink device 105 connects to the sink device 102 via a cable 108. The adapter device for the sink device 106 connects to the sink device 103 via a cable 109. These devices connected each other transmit data via the wired interfaces.

The cables 107 to 109 are, for example, HDMI cables.

Data is transmitted, via a wireless section, (i) between the adapter device for the source device 104 and the adapter device for the sink device 105, and (ii) between the adapter device for the source device 104 and the adapter device for the sink device 106. Each device uses a wireless interface included therein to transmit data.

Specifically, the wireless interface may be a wireless Local Area Network (LAN), and Transfer Jet (trademark). The wireless interface may use any given electromagnetic waves such as infrared rays.

As shown in FIG. 1, the wireless communications system 100 according to Embodiment 1 includes, for example, two sink devices such as TVs and one source device such as a DVD player.

Figure 2:
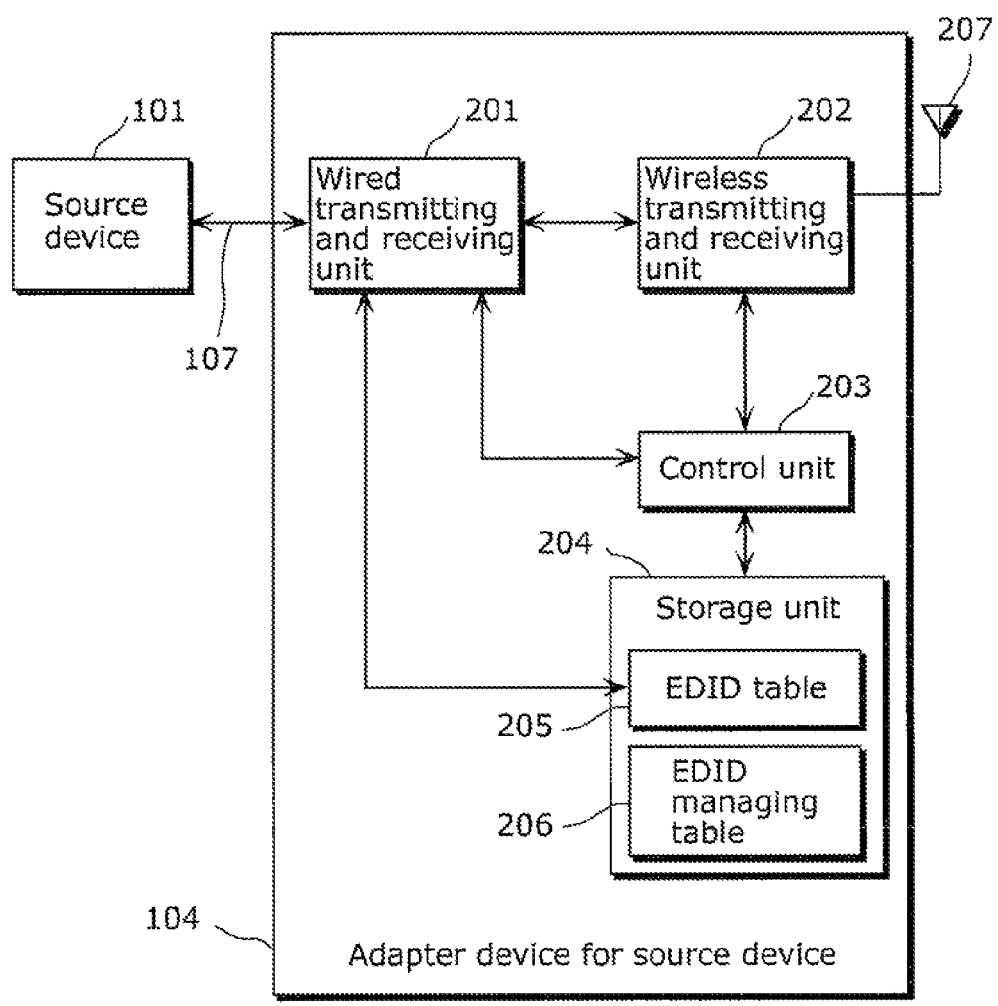
FIG. 2 is a block diagram exemplifying an adaptor device for the source device according to Embodiment 1 of the present invention.

FIG. 2 is a block diagram exemplifying in detail an adaptor device for an adapter device for a source device according to Embodiment 1 of the present invention.

As shown in FIG. 2, the adapter device for the source device 104 includes a wired transmitting and receiving unit 201, a wireless transmitting and receiving unit 202, a control unit 203, a storage unit 204, an EDID table 205, an EDID managing table 206, and an antenna 207.

Receiving an AV signal from the source device 101 via the cable 107, the wired transmitting and receiving unit 201 transmits the AV signal to either the adapter device for the sink device 105 or the adapter device for the sink device 106 via the wireless transmitting and receiving unit 202 and the antenna 207. Furthermore, receiving a control signal from either the adapter device for the sink device 105 or the adapter device for the sink device 106 via the antenna 207 and the wireless transmitting and receiving unit 202, the wired transmitting and receiving unit 201 transmits the control signal to the source device 101 via the cable 107.

Here the AV signal is a video signal obtained out of content included in the source device 101. The content undergoes reproduction processing such as decoding processing, so that the AV signal is generated. It is noted that the AV signal may include a video signal, as well as an audio signal.

The control signal is necessary to execute the processing for carrying out transmission of the AV signal, in a displayable format for the sink devices, from the source device 101 to the sink devices. The processing includes synchronous processing on a video signal and authentication processing. Specifically, the control signal is such as the authentication requesting signal, the authentication responding signal, the EDID requesting signal, the EDID responding signal, the connection completion notifying signal, and the connection completion responding signal; however, the control signal shall not be limited to these signals as far as the control signal is used with in the scope of the above purpose.

The wireless transmitting and receiving unit 202 encodes the audio signal and the video signal included in the AV signal to generate a transmission packet. Here the AV signal is read from the source device 101 via the cable 107. Next, the wireless transmitting and receiving unit 202 modulates a carrier wave having a predetermined frequency according to the generated transmission packet to generate a wireless AV signal. Then the wireless transmitting and receiving unit 202 transmits, via the antenna 207, the wireless AV signal to either the adapter device for the sink device 105 or the adapter device for the sink device 106.

The wireless transmitting and receiving unit 202 also encodes the control signal provided from the control unit 203 to generate the transmission packet. Next, the wireless transmitting and receiving unit 202 modulates a carrier wave having a predetermined frequency according to the generated transmission packet, so that the wireless transmitting and receiving unit 202 generates a control signal. Then the wireless transmitting and receiving unit 202 transmits, via the antenna 207, the control signal to either adapter device for the sink device 105 or the adapter device for the sink device 106.

The wireless transmitting and receiving unit 202 receives, via the antenna 207, a wireless control signal having a predetermined frequency and transmitted from either the adapter device for the sink device 105 or the adapter device for the sink device 106. Then the wireless transmitting and receiving unit 202 executes, on the received control signal, frequency conversion processing, received packet processing, and decoding processing, and provides the processed control signal to the control unit 203.

The control unit 203 executes wireless connection processing (detailed later with reference to FIG. 8) according to the control signal received from either the adapter device for the sink device 105 or the adapter device for the sink device 106 via the antenna 207 and the wireless transmitting and receiving unit 202. In addition, the control unit 203 reads the EDID information from the storage unit 204, and writes the EDID information to the storage unit 204.

The storage unit 204 is, for example, a semiconductor memory element such as a Dynamic Random Access Memory (DRAM). The storage unit 204 includes the EDID table 205 and the EDID managing table 206. The EDID table 205 holds the EDID information of the sink device which is currently having a connection. The EDID managing table 206 manages the history of the EDID information of sink devices which were previously connected to the adapter device for the source device 104. In the case where the adapter device for the source device 104 is not currently wirelessly connected to a sink device, the EDID table 205 holds the EDID information of a previous sink device which was wirelessly connected to the adapter device for the source device 104.

For example, the source device 101 obtains the EDID information, which a connected sink device has, from the EDID table 205 via the cable 107 and the wired transmitting and receiving unit 201.

FIG. 3 is a block diagram exemplifying in detail an adaptor device for a sink device according to Embodiment 1.

As shown in FIG. 3, each of the adapter device for the sink device 105 and the adapter device for the sink device 106 includes an antenna 301, a wireless transmitting and receiving unit 302, a wired transmitting and receiving unit 303, a control unit 304, a storage unit 305, and an EDID table 306. The adapter device for the sink device 105 and the adapter device for the sink device 106 share the same structure; therefore only the adapter device for the sink device 105 is described here.

The wireless transmitting and receiving unit 302 receives the wireless AV signal transmitted from the adapter device for the source device 104 via the antenna 301. Next, the wireless transmitting and receiving unit 302 executes, on the received wireless AV signal, frequency conversion processing, reception packet processing, and decoding processing in order to generate an AV signal. Then the wireless transmitting and receiving unit 302 provides the AV signal, including a video signal and an audio signal which have undergone the processing, to the sink device 102 via the wired transmitting and receiving unit 303 and the cable 108.

Moreover, the wireless transmitting and receiving unit 302 executes, on the control signal received via the antenna 301, frequency conversion processing, reception packet processing, and decoding processing. Then the wireless transmitting and receiving unit 302 provides the processed control signal to the control unit 304.

The wireless transmitting and receiving unit 302 encodes the control signal provided from the control unit 304 to generate a transmission packet. Next, the wireless transmitting and receiving unit 302 modulates the generated transmission packet according to a carrier wave having a predetermined frequency, so that the wireless transmitting and receiving unit 302 generates a control signal. Then the wireless transmitting and receiving unit 302 transmits the generated control signal to the adapter device for the source device 104 via the antenna 301.

While transmitting the AV signal to the sink device 102 via the cable 108, the wired transmitting and receiving unit 303 receives the EDID information from the sink device 102 via the cable 108, and provides the EDID information to the control unit 304.

The control unit 304, for example, generates a control signal for notifying the adapter device used for the source device 104 of the device ID for the adapter device for the sink device 105, and provide the control signal to the wireless transmitting and receiving unit 302.

Here the device ID is information to uniquely identify a sink device or the adapter device for the sink device, such as the Media Access Control (MAC) address of the adapter device for the sink device for a wireless communications interface.

The control unit 304 executes wireless connection processing (detailed later with reference to FIG. 8) according to the control signal received from the adapter device for the source device 104 via the antenna 301 and the wireless transmitting and receiving unit 302. Furthermore, the control unit 304 obtains the EDID information from the sink device 102 via the wired transmitting and receiving unit 303 and the cable 108. Moreover, the control unit 304 stores the obtained EDID information in the EDID table included in the storage unit 305, and reads the EDID information as necessary. Specifically, the control unit 304 stores the EDID information of the sink device 102 in the EDID table 306 included in the storage unit 305.

FIG. 4 exemplifies a structure of data stored in the EDID managing table included in the storage unit 204 in the adapter device for the source device 104.

As shown in FIG. 4, the EDID managing table associates, to record, the device ID (for example the MAC address for the air interface) of an adapter device for the sink device with the EDID table included in the adapter device. Here the adapter device has established a wireless connection with the adapter device for the source device 104.

For example, an adapter device for a sink device having the device ID of "1.0.0.0" corresponds to EDID1 of the EDID. It means that when the adapter device for the source device 104 notifies the source device 101 of the EDID information of a sink device, the adapter device for the source device 104 assumes that EDID 1 is the EDID information of the sink device connected to the adapter device for the sink device having the device ID of "1.0.0.0".

Figure 5:
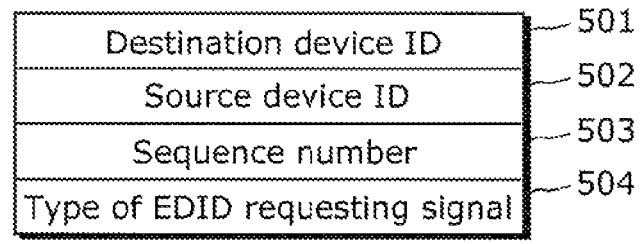
FIG. 5 shows a format of an EDID requesting signal according to Embodiment 1 of the present invention.
Figure 6:
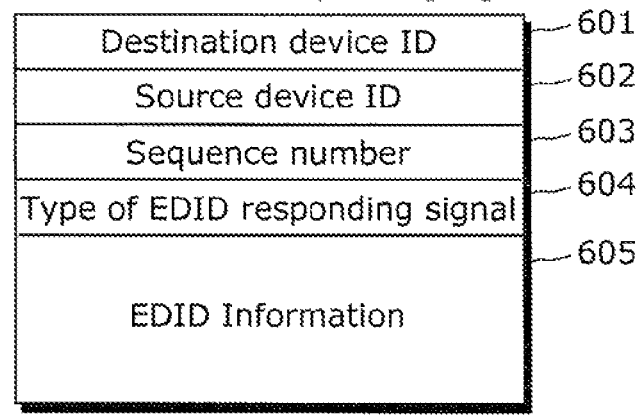
FIG. 6 shows a format of an EDID responding signal according to Embodiment 1 of the present invention.

FIGS. 5 and 6 respectively exemplify formats of the EDID requesting signal and the EDID responding signal.

As shown in FIG. 5, the format of the EDID requesting signal includes a destination device ID area 501, a source device ID area 502, a sequence number area 503, and a type area 504. The type area 504 indicates a type of the EDID requesting signal.

The destination device ID area 501 holds the device ID of either the adapter device for the sink device 105 or the adapter device for the sink device 106 both of which are destinations of the EDID requesting signal. The source device ID area 502 holds the device ID of the adapter device for the source device 104 which is the source of the EDID requesting signal. The sequence number area 503 holds a sequence number generated by the control unit 203 with reference to an internal counter. The type area 504 holds a type of the EDID requesting signal as necessary.

As shown in FIG. 6, the format of the EDID responding signal includes a destination device ID area 601, a source device ID area 602, a sequence number area 603, a type area 604, and an EDID information area 605.

The destination device ID area 601 holds the device ID of the adapter device for the source device 104 which is the destination of the EDID responding signal. The source device ID area 602 holds the device ID of either the adapter device for the sink device 105 or the adapter device for the sink device 106 both of which are sources of the EDID responding signal. The sequence number area 603 holds the same number as that held in the sequence number area 503 for the EDID requesting signal in FIG. 5. As necessary, the type area 604 holds a type of the EDID responding signal. The EDID information area 605 holds the EDID information read from the EDID table 306 found in the storage unit 305 included in either the adapter device for the sink device 105 or the adapter device for the sink device 106.

Figure 7:
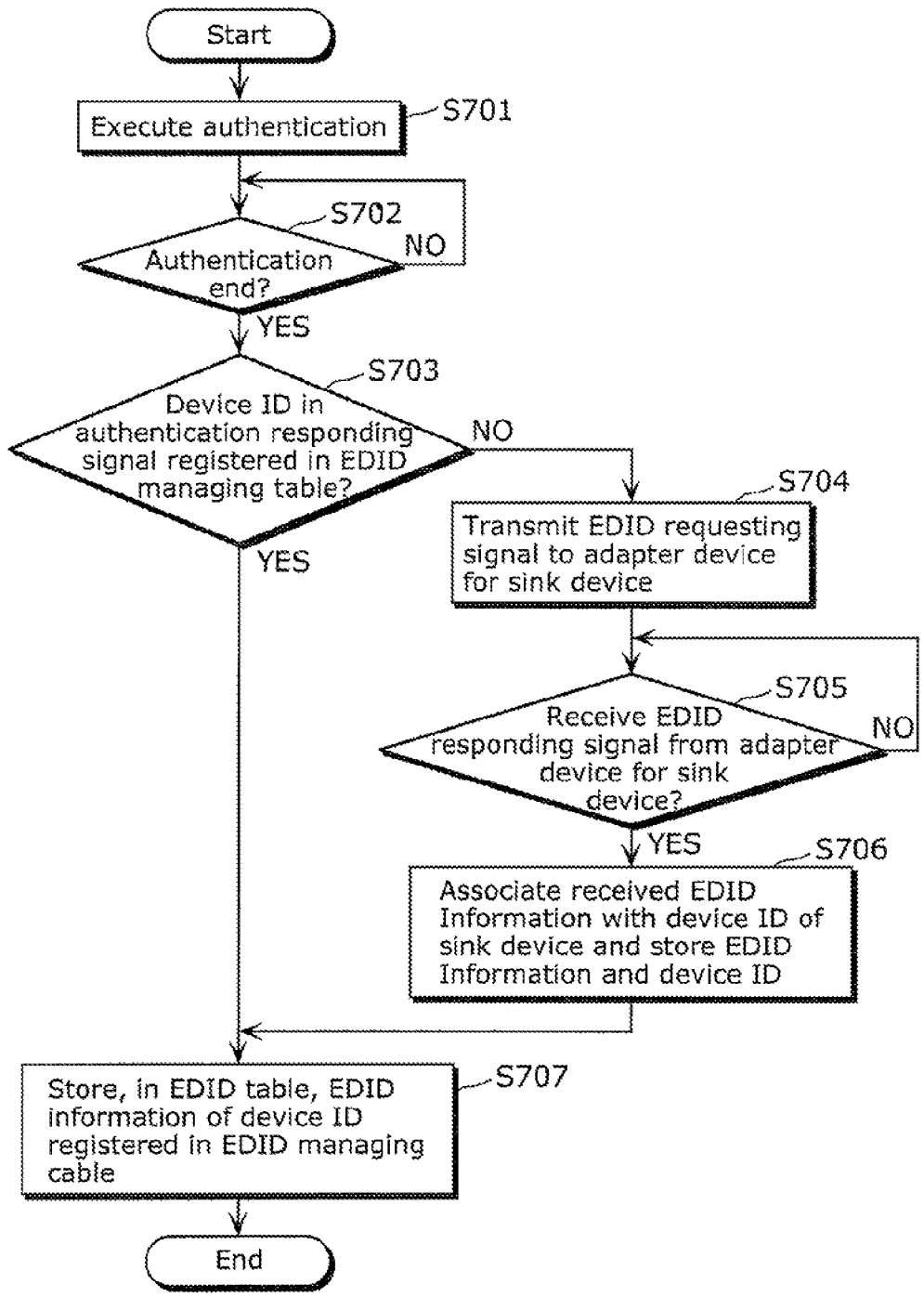
FIG. 7 is a flowchart showing how a control unit 203 obtains EDID according to Embodiment 1 of the present invention.

FIG. 7 is a flowchart showing an EDID obtaining process executed by the control unit 203 in the adapter device for the source device 104 shown in FIG. 2.

In Step S701 shown in FIG. 7, the control unit 203 executes an HDMI-based authentication procedure on either the adapter device for the sink device 105 or the adapter device for the sink device 106 which is about to establish a connection.

In the authentication procedure, the adapter device for the source device 104 transmits, to one of the adapter devices for the sink device to establish a connection, the authentication requesting signal which is a control signal to request to start the authentication.

The adapter device for the sink device generates authentication responding information based on information included in the authentication requesting signal received from the adapter device for the source device 104. Then the adapter device for the sink device transmits the authentication responding signal to the source device 101. The authentication responding signal is a control signal including the authentication responding information. Here the adapter device for the sink device puts its own device ID in the authentication responding signal, and transmits the authentication responding signal to the adapter device for the source device 104.

In Step S702, in the case where (i) the control unit 203 receives the authentication responding signal in a given amount of time and (ii) the control unit 203 determines that the authentication responding information included in the authentication responding signal is authentic, the control unit 203 determines that the authentication procedure ends (S702: YES). Then the process proceeds to Step S703. In the case where either (i) the control unit 203 cannot receive the authentication responding signal in the given amount of time or (ii) the control unit 203 determines that the authentication responding information is unauthentic (S702: NO), the process goes back to Step S702. Then the control unit 203 repeats the authentication procedure.

It is noted that the adapter device for the source device 104 may utilize, as a trigger, the reception of the HDMI-based authentication requesting signal from the source device 101, and start the authentication procedure with the adapter device for the sink device. Here the adapter device for the source device 104 reflects the result of the authentication procedure in the HDMI-based authentication responding signal, and notifies the source device 101 of the result of the authentication procedure. Hence the adapter device for the source device 104 successfully coordinates (i) the HDMI-based device authentication executed in a section between the source device 101 and the adapter device for the source device 104 and (ii) the authentication executed in a wirelessly-connected section; that is, the authentication of the adapter device for the source device 104 and the adapter device for the sink device.

The adapter device for the sink device may utilize, as a trigger, the reception of the authentication requesting signal from the adapter device for the source device 104, and start the HDMI-based authentication procedure for the corresponding sink device. Here the adapter device for the sink device reflects the result of the HDMI-based authentication in the generation of the authentication responding information. Hence the adapter device for the sink device successfully coordinates (i) the HDMI-based device authentication executed in a section between the sink device and the corresponding adapter device for the sink device and (ii) the device authentication executed in a wirelessly connected section.

Next, in Step S703, the control unit 203 determines whether or not the device ID of the adapter device for the sink device is registered in the EDID managing table 206. The device ID is included in the authentication responding signal. In the case where the device ID is registered (S703: YES), the process proceeds to Step S707. In the case where the device ID is not registered (S703: NO), the process proceeds to Step S704.

In Step S704, the control unit 203 transmits the EDID requesting signal to the adapter device for the sink device which has transmitted the authentication responding signal. The EDID requesting signal is a control signal requesting the adapter device for the sink device to transmit the EDID.

In Step S705, the control unit 203 determines whether or not the control unit 203 has received the EDID responding signal, in a given amount of time, from the adapter device for the sink device which transmitted the EDID requesting signal. In the case where the control unit 203 has received the EDID responding signal (S705: YES), the process proceeds to Step S706. In the case where the control unit 203 has not received the EDID responding signal (S705: NO), the process goes back to Step S705. Then the control unit 203 repeats the processing in Step S705.

Next, in Step S706, the control unit 203 associates the EDID information included in the received EDID responding signal with the device ID included in the previously-received authentication responding signal. Then the control unit 203 stores the EDID information and the device ID in the EDID managing table 206. Furthermore, the control unit 203 stores in the EDID table 205 the EDID information of the currently-connected sink device.

Figure 8:
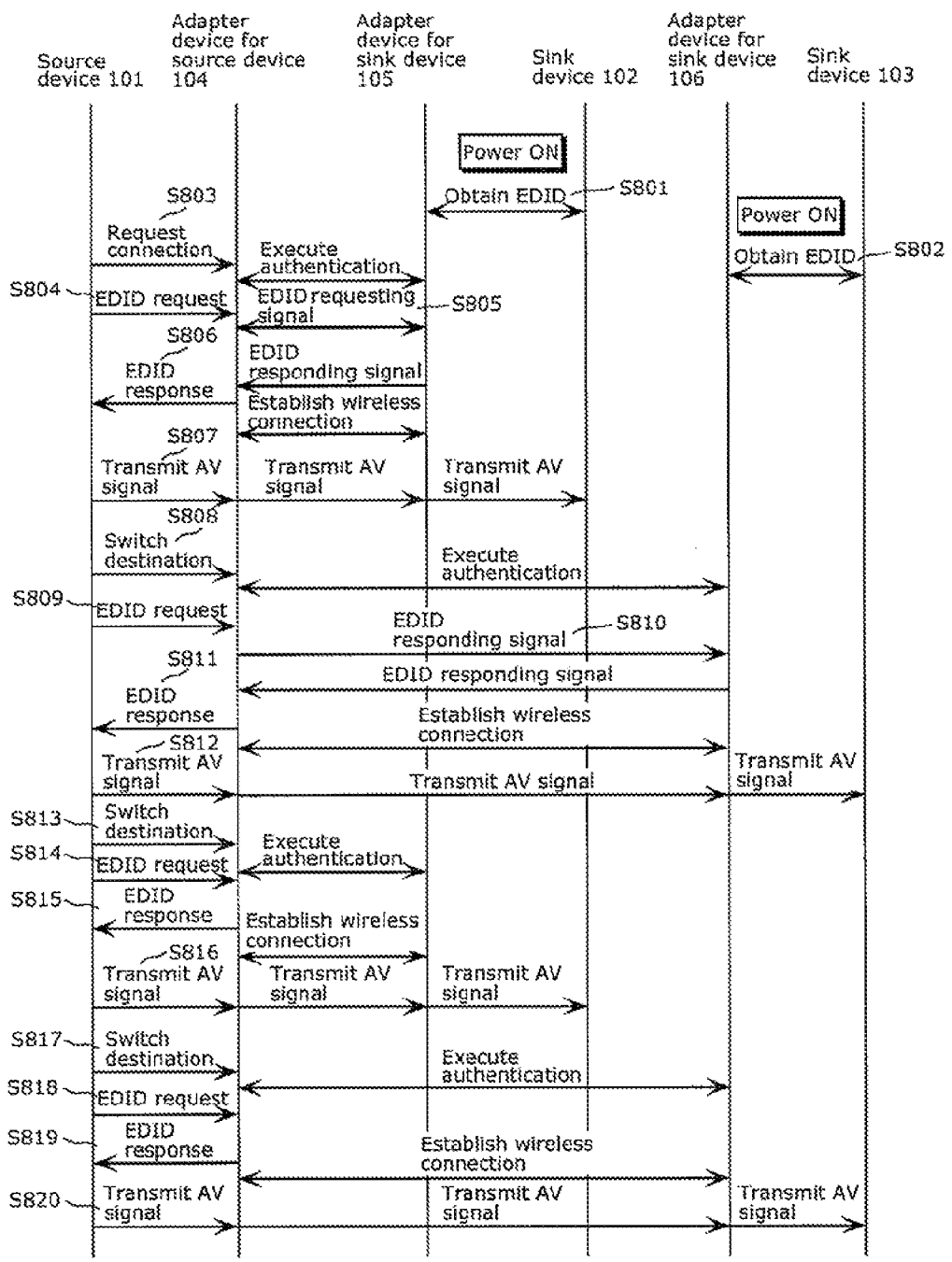
FIG. 8 is a sequence diagram showing connection switching according to Embodiment 1 of the present invention.

FIG. 8 is a sequence diagram showing signals to be transmitted and received between the source device 101, the sink device 102, the sink device 103, the adapter device for the source device 104, the adapter device for the sink device 105, and the adapter device for the sink device 106 in FIG. 1.

It is noted that FIG. 8 sequentially shows that the destination of wireless connection to the source device 101 changes in the order of the sink device 102, the sink device 103, the sink device 102, and the sink device 103.

In FIG. 8, suppose the case where no EDID information is held in the EDID managing table 206 of the adapter device for the source device 104. When each of the sink device 102 and the sink device 103 turns on, the control units 304 of the adapter device for the sink device 105 and the adapter device for the sink device 106 respectively obtain the EDID information from the sink device 102 and the sink device 103, and store the obtained EDID information in the corresponding EDID tables 306 (S801 and S802).

First, a user operates the source device 101 to transmit the AV signal to the sink device 102. Then the source device 101 provides a signal, which requests to establish a connection with the sink device 102, to the adapter device for the source device 104 (S803). Next, the adapter device for the source device 104 executes the authentication procedure with the adapter device for the sink device 105. When the authentication procedure ends, the source device 101 requests the sink device 102 to transmit the EDID information (S804).

The control unit 203 in the adapter device for the source device 104 determines whether or not the EDID information of the sink device 102 should be held in the EDID managing table 206. Here the EDID information of the sink device 102 is not stored. Thus the adapter device for the source device 104 transmits, to the adapter device for the sink device 105, the EDID requesting signal which requests the EDID information of the sink device 102.

Upon receiving the EDID requesting signal, the control unit 304 in the adapter device for the sink device 105 obtains, from the EDID table 306, the already-obtained EDID information of the sink device 102. Furthermore, the control unit 304 transmits, to the adapter device for the source device 104, the EDID responding signal including the obtained EDID information and the device ID of the control unit 304.

The adapter device for the source device 104 associates the EDID information, of the sink device 102, included in the received EDID responding signal with the device ID of the source (the device ID of the adapter device for the sink device 105). Then the adapter device for the source device 104 stores the associated EDID information and device ID in the EDID managing table 206. Moreover, the adapter device for the source device 104 stores the EDID information of the currently-connected sink device 102 in the EDID table 205. Then the adapter device for the source device 104 provides an EDID response to the source device 101 (S806).

Once the adapter device for the source device 104 and the adapter device for the sink device 105 have established a wireless connection, the AV signal starts to be transmitted from the source device 101 to the sink device 102 (S807).

Here suppose the transmission of the AV signal ends, and, for example, the user operates the source device 101 to switch the destination from the sink device 102 to the sink device 103 (S808).

Here, when the HDMI-based authentication procedure ends between the adapter device for the source device 104 and the adapter device for the sink device 106, the source device 101 requests the sink device 103 to transmit the EDID information (S809).

Next the control unit 203 in the adapter device for the source device 104 determines whether or not the EDID information of the sink device 103 is held in the EDID managing table 206. Similar to the case of the sink device 102, the EDID information of the sink device 103 is not held in the EDID managing table 206. Thus, as well as the case of the sink device 102, the adapter device for the source device 104 transmits the EDID requesting signal to the adapter device for the sink device 106 (S810). Upon receiving the EDID responding signal from the adapter device for the sink device 106, the adapter device for the source device 104 associates the EDID information, of the sink device 103, included in the received EDID responding signal with the device ID of the adapter device for the sink device 106. Then the adapter device for the source device 104 stores the associated EDID information and device ID in the EDID managing table 206.

Moreover, the adapter device for the source device 104 stores the EDID information of the currently-connected sink device 103 in the EDID table 205. Then the adapter device for the source device 104 provides an EDID response to the source device 101 (S811).

Once the adapter device for the source device 104 and the adapter device for the sink device 106 have established a wireless connection, the AV signal starts to be transmitted from the source device 101 to the sink device 103 (S812).

Suppose the following case when the transmission of the AV signal ends: The user again operates the source device 101 to switch the destination to the sink device 102 (S813).

In this case, as well, the control unit 203 in the adapter device for the source device 104 executes the authentication procedure with the adapter device for the sink device 105. Next, the source device 101 transmits the EDID requesting signal to the sink device 102 via the adapter device for the source device 104 (S814). Upon receiving the EDID requesting signal, the adapter device for the source device 104 determines whether or not the device ID of the adapter device for the sink device 105 is held in the EDID managing table 206. Here the device ID is obtained in the authentication procedure, and the adapter device for the sink device 105 corresponds to the sink device 102 on a one-on-one basis.

In this case, the device ID of the adapter device for the sink device 105 is held in the EDID managing table 206. Thus the adapter device for the source device 104 stores the EDID information of the sink device 102 in the EDID table 205. Here the EDID information corresponds to the device ID, of the adapter device for the sink device 105, held in the EDID managing table 206. Moreover, the adapter device for the source device 104 provides the EDID information of the sink device 102 to the source device 101 (S815).

Then a wireless connection is established between the adapter device for the source device 104 and the adapter device for the sink device 105, and the AV signal is transmitted from the source device 101 to the sink device 102 via the adapter device for the source device 104 and the adapter device for the sink device 105 (S816).

Next assume the case where the user operates the source device 101 to switch the destination to the sink device 103 (S817). After the control unit 203 in the adapter device for the source device 104 executes the authentication procedure with the adapter device for the sink device 106, the source device 101 transmits an EDID requesting signal to the sink device 103 via the adapter device for the source device 104 (S818).

Next assume the case where the user operates the source device 101 to switch the destination to the sink device 103 (S817). After the control unit 203 in the adapter device for the source device 104 executes the authentication procedure with the adapter device for the sink device 106, the source device 101 transmits an EDID information requesting signal to the sink device 103 via the adapter device for the source device 104 (S818).

Then the adapter device for the source device 104 determines whether or not the device ID of the adapter device for the sink device 106 is held in the EDID managing table 206. Here the device ID is obtained in the authentication procedure, and the adapter device for the sink device 106 corresponds to the sink device 103 on a one-on-one basis.

In this case, the device ID of the adapter device for the sink device 106 is held in the EDID managing table 206. Hence the adapter device for the source device 104 stores, in the EDID table 205, the EDID information corresponding to the device ID of the adapter device for the sink device 106. Here the device ID has already been held in the EDID managing table 206. Moreover, the adapter device for the source device 104 provides the EDID information to the source device 101 (S819).

Then a wireless connection is established between the adapter device for the source device 104 and the adapter device for the sink device 106, and the AV signal is transmitted from the source device 101 to the sink device 103 via the adapter device for the source device 104 and the adapter device for the sink device 106 (S820).

In other words, the wireless communications system 100 includes: a video device (the source device) 101 which provides a video signal; an adapter device, for the video device (the adapter device for the source device) 104, which is connected to the video device (the source device) 101 and wirelessly transmits the video signal; a video device (the sink device) 102; and an adapter device, for the video device (the adapter device for the sink device) 105, which (i) receives the wirelessly-transmitted video signal, and (ii) provides the received video signal to the video device (the sink device) 102. The adapter device for the video device (the adapter device for the source device) 104 includes: the storage unit 204, the wireless transmitting and receiving unit 202; and the control unit 203.

When wirelessly transmitting the video signal to the video device 102, the control unit 203

(i) in the case where setting information is stored in the storage unit 204, (a) obtains the setting information from the storage unit 204, (b) transmits the obtained setting information to the video device 101, (c) receives from the video device 101 a video signal which is compliant with the setting information, and (d) causes the wireless transmitting and receiving unit 202 to wirelessly transmit the received video signal, the setting information indicating specifications of video displayable on the video device 102, and (ii) in the case where setting information is not stored in the storage unit 204, (a) obtains the setting information from the adapter device for the second video device 105, (b) transmits the obtained setting information to the video device 101, (c) receives from the video device 101 a video signal which is compliant with the setting information, and (d) causes the wireless transmitting and receiving unit 202 to wirelessly transmit the received video signal, and (e) stores the setting information in the storage unit 204.

Furthermore, the adapter device for the video device 105 includes: a wireless transmitting and receiving unit 302; and a control unit 304 which wirelessly transmits, to the adapter device for the video device 104, the setting information being obtained from the video device 102.

As described above, the wireless communications system 100 according to Embodiment 1 associates previously-obtained EDID information with a device ID, and stores the EDID information and the device ID in an EDID managing table. Thus when the wireless communications system 100 re-establishes a wireless connection with a previously-connected device, the wireless communications system 100 obtains the EDID information of the target appliance from the EDID managing table. This operation contributes to reducing a switching time when the wireless communications system 100 switches wirelessly connected destinations.

It is noted that in Embodiment 1, the destinations are switched by the source device 101; however, the switching of the destinations may be triggered by the sink device 102 or by a user operation on the sink device 103-side. Moreover, the following timing may be used as triggers for the switching of the destinations; when any one of the source device, the adapter device for the source device, and the sink device terminates the connection with another device, and when the power of each device turns off.

In addition, the adapter device for the source device or the adapter device for the sink device may respectively have two or more source devices or sink devices. Here used as the device IDs may be a combination of the physical address (MAC address) of a wireless module included in the adapter device and an identification number of the wired interface. The combination makes possible uniquely identifying the source device or the sink device.

In the case where a device ID is uniquely assigned to each of two or more source devices and sink devices, the device IDs for the source device and the sink device may be used as device IDs. Here the EDID table of the adapter device for the sink device may associate the device ID of the connected sink device with the EDID information of the sink device, which contributes to reducing the time for the authentication procedure.

Embodiment 2

Conventional techniques require the synchronization (the vertical synchronization and the horizontal synchronization of a video signal) between a sink device and an adapter device for the sink device whenever a sink device providing AV signals is switched from one to another. Described next is Embodiment 2 regarding the wireless communications system 100, omitting the synchronization and making the switching between sink devices more efficient.

It is noted that the structure of the wireless communications system 100 in Embodiment 2 is similar to that shown in FIG. 1, and the details thereof shall be omitted.

Figure 9:
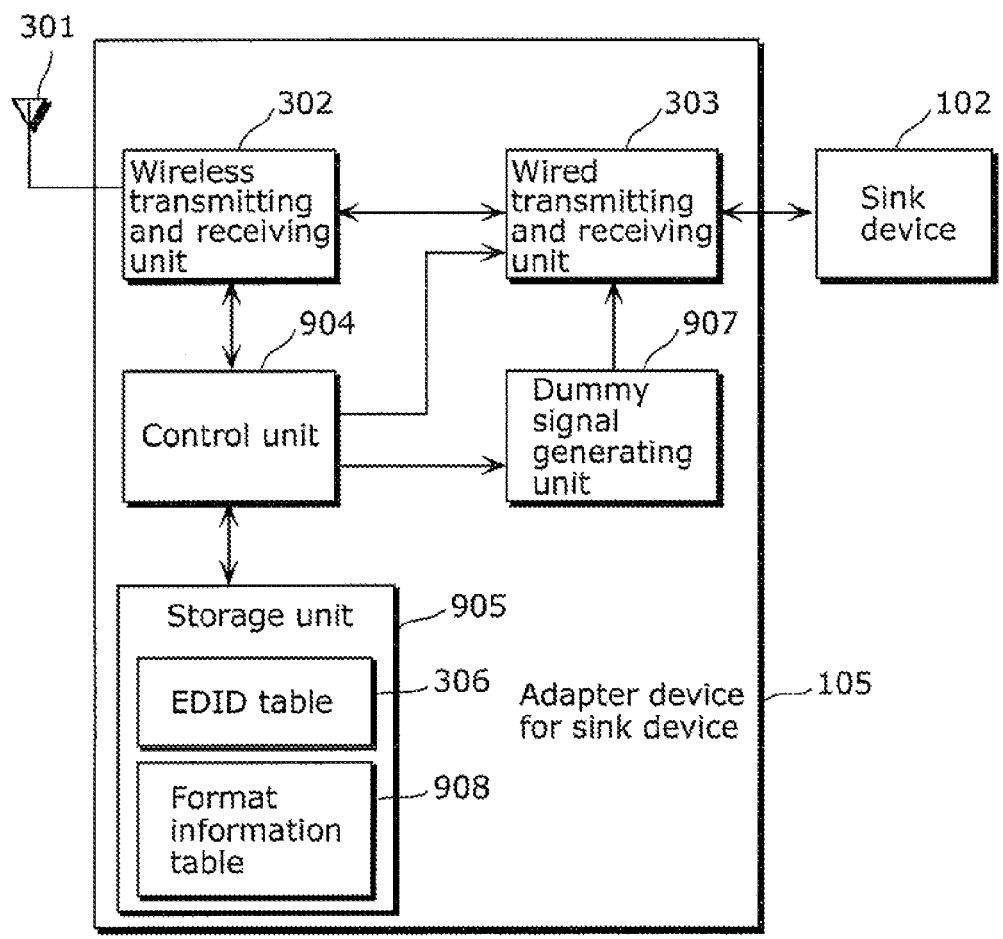
FIG. 9 is a block diagram exemplifying an adaptor device for a sink device according to Embodiment 2 of the present invention.

FIG. 9 is a block diagram showing a structure of the adapter device for the sink device 105 included in the wireless communications system 100 according to Embodiment 2 of the present invention. It is noted that the adapter device for the sink device 105 and the adapter device for the sink device 106 share the same structure. Thus only the adapter device for the sink device 105 shall be described.

As shown in FIG. 9, the adapter device for the sink device 105 includes the antenna 301, the wireless transmitting and receiving unit 302, the wired transmitting and receiving unit 303, a control unit 904, a storage unit 905, the EDID table 306, a dummy signal generating unit 907, and a format information table 908.

The adapter device for the sink device 105 in FIG. 9 is the adapter device for the sink device 105 according to Embodiment 1 additionally including the dummy signal generating unit 907 and the format information table 908.

In addition to the operations executed by the control unit 304 shown in FIG. 3, the control unit 904 in FIG. 9 reads from and writes to the format information table included in the storage unit 905. The control unit 904 obtains the format information from the AV signal received from the source device 101 via the wireless transmitting and receiving unit 302. The format information, which is necessary to properly reproduce the AV signal, is such as an image size, a scanning technique, and a synchronizing frequency of the video signal which are included in the AV signal.

Then the control unit 904 stores the obtained format information in the format information table 908. In other words, the format information table 908 holds the format information of the latest AV signal which the adapter device for the sink device 105 is currently receiving. It is noted that when the adapter device for the sink device 105 does not receive the AV signal, the format information table 908 holds the format information of the AV signal which was received immediately before.

The control unit 904 periodically determines whether or not the wireless transmitting and receiving unit 302 is receiving the AV signal. Suppose here that the user operates the sink device to switch the sink device transmitting the AV signal from the sink device 102 to the sink device 103. This disrupts the wireless communications (receiving the AV signal) between the source device 101 and the adapter device for the sink device 105.

Determining that the wireless transmitting and receiving unit 302 is not receiving the AV signal, the control unit 904 provides the format information, which the control unit 904 itself has read from the format information table 908, to the dummy signal generating unit 907.

Upon receiving the format information, the dummy signal generating unit 907 generates a dummy signal; that is, an AV signal having the same format information as the obtained format information.

By the time the adapter device for the sink device 105 receives the AV signal from the source device 101 once again, the control unit 904 provides the dummy signal generated by the dummy signal generating unit 907 to the disconnected sink device 102.

Usually, the synchronization between the adapter device for the sink device 105 and the sink device 102 is terminated when no AV signals are observed for several frames as a result of switching the destination of the AV signal from the source device 101 to another sink device (the sink device 103).

However, the control unit 904 continues to provide the dummy signals instead of the AV signal to the sink device 102 by the time the sink device 102 receives the AV signal once again, so that the adapter device for the sink device 105 and the sink device 102 can continue the synchronization therebetween. As a result, the resynchronization process of the adapter device for the sink device 105 with the sink device 102 is unnecessary when the AV signal is provided from the source device 101 to the sink device 102 again.

The storage unit 905 holds the EDID table 306 for the sink device 102, and the format information table 908. As described above, the format information table 908 holds the format and the size of the audio signal and the video signal included in the AV signal transmitted from the source device 101.

FIG. 10 exemplifies the format information held in the format information table 908.

As shown in FIG. 10, the format information includes the following as a video format; an image size (effective pixels and total pixels) a video scanning technique (the progressive scanning or the interlaced scanning), a horizontal synchronous frequency, a vertical synchronous frequency, and a pixel frequency. In addition, the format information includes the following as an audio format; a sampling frequency, a sampling size (the number of bits), the number of channels, and the coding format information.

It is noted that the format information shown in FIG. 10 is an example. The format information may indirectly specify the information in FIG. 10 or may include information other than the shown information.

Figure 11:
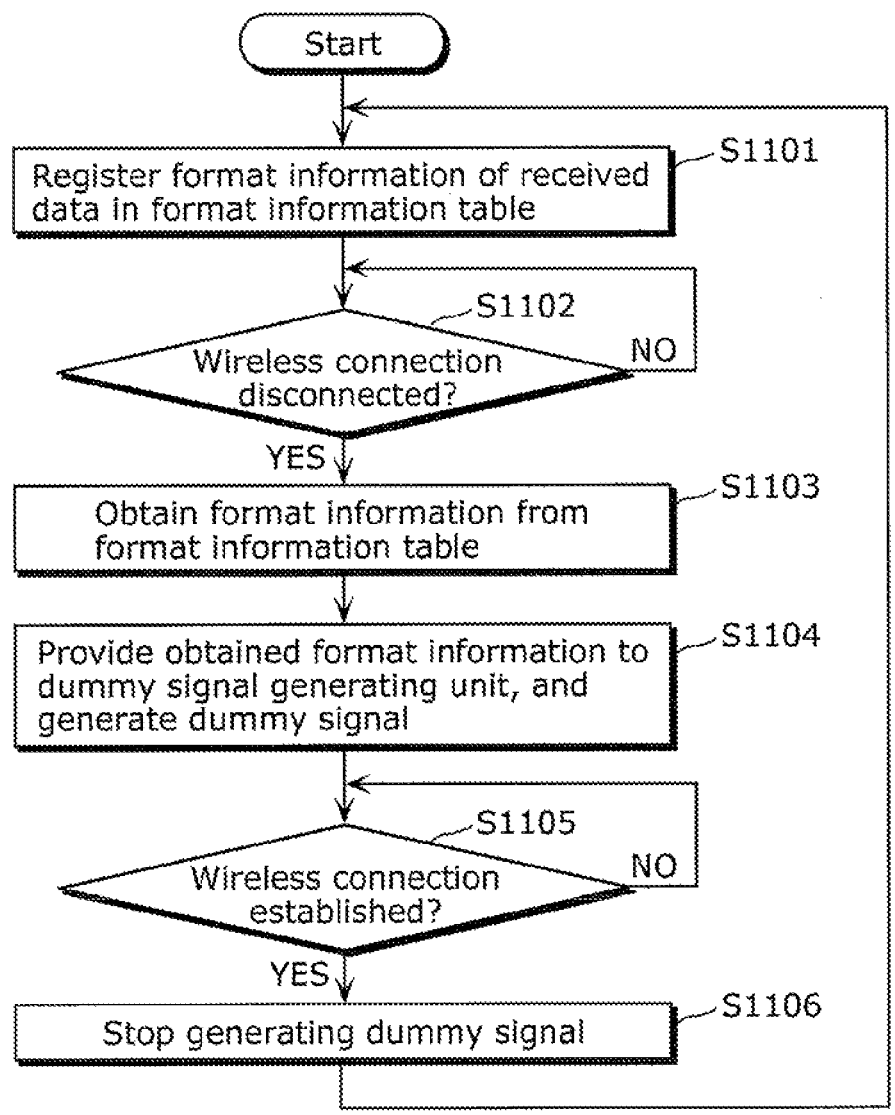
FIG. 11 is a flowchart showing how a control unit 904 generates a dummy signal according to Embodiment 2 of the present invention.

FIG. 11 is a flowchart showing a flow of how the control unit 904 generates the dummy signal.

In Step S1101 of FIG. 11, the control unit 904 obtains the format information of a video signal received from the wireless transmitting and receiving unit 302, and registers the information in the format information table 908. In other words, the format information table 908 always holds the latest format information. The timing to register the format in the format information table 908 may be, for example, the following: The format information may be registered at regular time intervals or every time the AV signal is obtained. The format information may be registered as soon as the power for the sink device or for the adapter for the sink device is ON. A specific control signal transmitted from the source device may be used as a trigger when the format information is registered.

In Step S1102, the control unit 904 determines whether or not the wireless connection with the source device 101 is disconnected. In the case of YES, the process proceeds to Step S1103. In the case of NO, the process goes back to Step S1102. Then the control unit 904 repeats the procedure.

In Step S1103, the control unit 904 obtains the format information from the format information table 908. Then the process proceeds to Step S1104. In Step S1104, the control unit 904 provides the obtained format information to the dummy signal generating unit 907, and causes the dummy signal generating unit 907 to generate a dummy signal which is based on the format information.

In Step S1105, the control unit 904 determines whether or not the wireless connection has been established. In the case of YES, the process proceeds to Step S1106. In the case of NO, the process goes back to Step 1105. Then the control unit 904 repeats the procedure. In Step S1106, the control unit 904 causes the dummy signal generating unit 907 to stop generating the dummy signal. Then the process goes back to Step S1101.

In the case where the dummy signal generated by the dummy signal generating unit 907 is video data, any given data may be acceptable as far as the format of the given data is the same as the format which the format information table 908 stores in image size, video scanning technique, pixel frequency, horizontal synchronous frequency, and vertical synchronous frequency.

Figure 12:
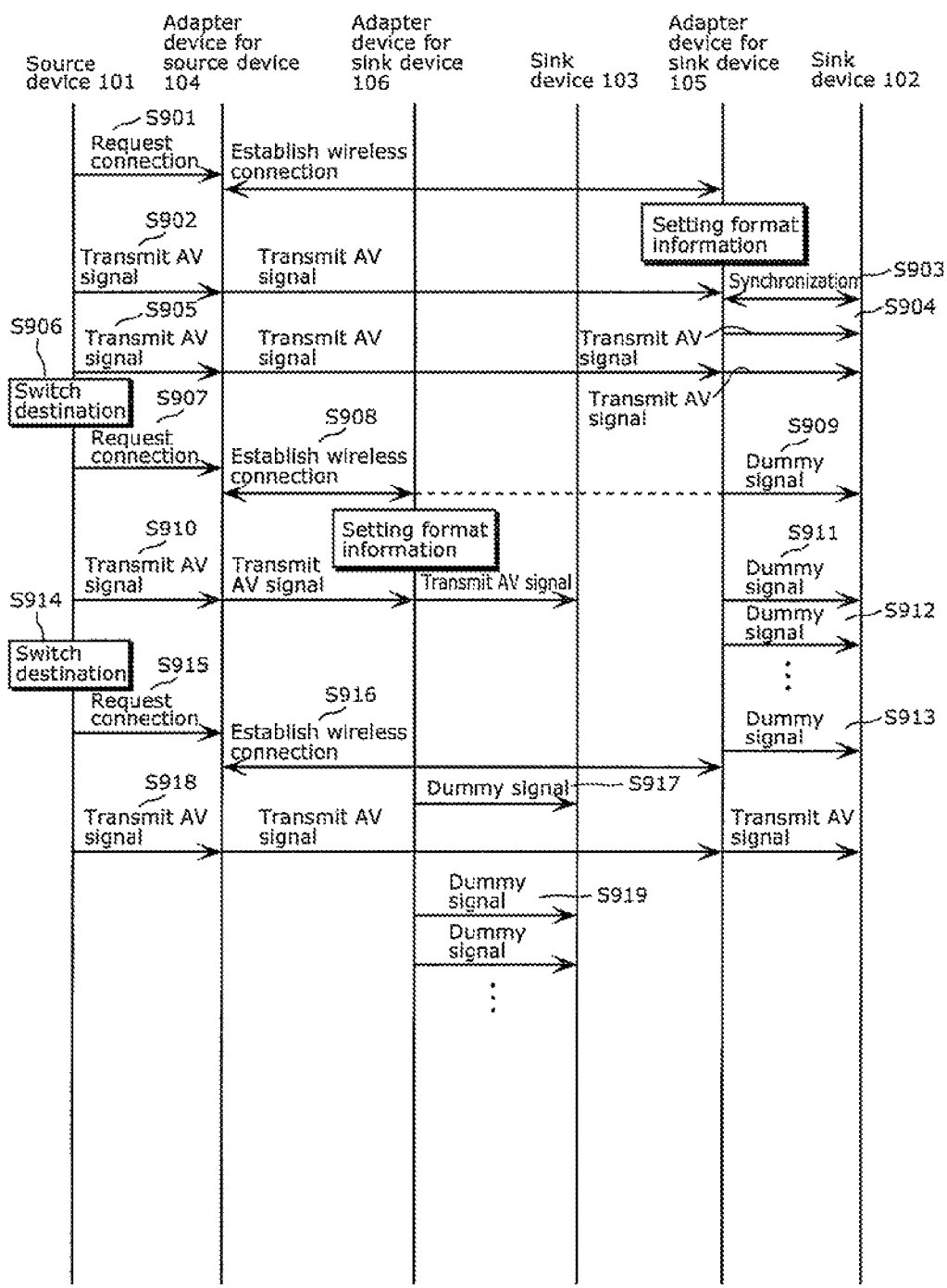
FIG. 12 is a sequence diagram showing timing of generating the dummy signal in Embodiment 2 of the present invention.

FIG. 12 is a sequence diagram showing signals to be transmitted and received between the source device 101, the sink device 102, the sink device 103, the adapter device for the source device 104, the adapter device for the sink device 105, and the adapter device for the sink device 106. It is noted that FIG. 12 sequentially shows that the destination of the wireless connection to the source device 101 changes in the order of the sink device 102, the sink device 103, and the sink device 102.

As shown in FIG. 12, first, the source device 101 provides a signal, which requests to establish a connection with the sink device 102, to the adapter device for the source device 104 (S901).

Next, the adapter device for the source device 104 and the adapter device for the sink device 105 are wirelessly connected. Once the wireless connection has been established, the source device 101 starts to transmit the AV signal to the sink device 102 via the adapter device for the source device 104 and the adapter device for the sink device 105 (S902).

Here, before the AV signal is transmitted from the adapter device for the sink device 105 to the sink device 102, the adapter device for the sink device 105 and the sink device 102 are synchronized (S903).

As described above, the synchronization is to match the adapter device for the sink device 105 and the sink device 102 in setting, regarding information on, for example, the signal synchronization and the display setting as shown in FIG. 10.

When the adapter device for the sink device 105 and the sink device 102 are synchronized, the adapter device for the sink device 105 transmits the AV signal to the sink device 102 (S904 and S905).

Upon receiving the AV signal, the adapter device for the sink device 105 obtains the format information from the received AV signal, and stores the format information in the format information table 908.

Next, the source device 101 switches the destination to the sink device 103 (S906). Then the source device 101 provides a connection requesting signal to the adapter device for the source device 104, so that the adapter device for the source device 104 can connect to the sink device 103 (S907). Thus the wireless connecting processing is executed between the adapter device for the source device 104 and the adapter device for the sink device 106 (S908).

Here, in the adapter device for the sink device 105, when the control unit 904 determines that the wireless connection between the adapter device for the sink device 105 and the adapter device for the source device 104 is disconnected, the control unit 904 causes the dummy signal generating unit 907 to generate dummy signals and to provide the dummy signals to the sink device 102 (S909).

The sink device 102 receives a dummy signal having the same format as that of the AV signal which the sink device 102 received immediately before.

The adapter device for the sink device 105 generates the dummy signals and transmits the dummy signals to the sink device 102 until the wireless connection request signal is transmitted again from the adapter device for the source device 104.

The sink device 102 actually establishes no connection with the source device 101; however, the sink device 102 continues to receive the dummy signals from the adapter device for the sink device 105, so that the sink device 102 and the source device 101 are virtually connected. As a result, the synchronization in the S903 remains effective (S911, S912, and S913).

Concurrently, the transmission of the AV signal from the source device 101 to the sink device 103 is carried out via the adapter device for the source device 104 and the adapter device for the sink device 106 (S910).

Upon receiving the AV signal, the adapter device for the sink device 106 obtains the format information from the received AV signal, and stores the format information in the format information table 908.

Next, suppose that the sink device, to which the source device 101 provides the AV signal is switched (S914), and the connection request signal is provided in order to switch to the sink device 102 again (S915).

Then the wireless connecting processing is executed between the adapter device for the source device 104 and the adapter device for the sink device 105 (S916). When the wireless connecting processing ends, the AV signal is transmitted again from source device 101 to the sink device 102 without the synchronization process executed in Step S903 (S918).

Furthermore, the adapter device for the sink device 105 stores the format information in the format information table 908 when previously establishing the wireless connection with the adapter device for the source device 104. Thus the adapter device for the sink device 105 does not have to set the format information.

Moreover, when the control unit 904 included in the adapter device for the sink device 105 determines that the wireless connection has been established again with adapter device for the source device 104, the control unit 904 causes the dummy signal generating unit 907 to stop generating the dummy signals.

Concurrently, when the control unit 904 included in the adapter device for the sink device 106 determines that the wireless connection with the adapter device for the source device 104 has been disconnected, the control unit 904 causes the dummy signal generating unit 907 to generate the dummy signals and to provide the dummy signals to the sink device 103 (S917).

As a result, the sink device 103 receives the dummy signals having the same format as that of the AV signal which the sink device 103 received immediately before. The adapter device for the sink device 106 generates the dummy signals and transmits the dummy signals to the sink device 103 until the wireless connection request signal is transmitted again from the adapter device for the source device 104 (S919). The sink device 103 actually establishes no connection with the source device 101; however, the sink device 103 continues to receive the dummy signals from the adapter device for the sink device 106, so that the sink device 103 and the source device 101 remain virtually connected.

Even though the dummy signals start to be generated, the wireless connection could not be reestablished after a long enough time period has passed for the wireless connection. In such a case, the dummy signals may be stopped, so that the convenience and the power saving can be balanced.

In other words, the wireless communications system 100 includes: a video device (the source device) 101 which provides a video signal; an adapter device, for the video device (the adapter device for the source device) 104, which is connected to the video device (the source device) 101 and wirelessly transmits the video signal; a video device (the sink device) 102; and an adapter device, for the video device (the adapter device for the sink device) 105, which (i) receives the wirelessly-transmitted video signal, and (ii) provides the received video signal to the video device (the sink device) 102.

Here the adapter device for the video device 105 further includes: a wireless transmitting and receiving unit 302; a dummy signal generating unit 907 which generates a dummy signal which is a dummy video signal having a format corresponding to a format of a video signal; and a storage unit 905, and a control unit 904 which (i) stores format information, in the storage unit 905, which specifies a format of the video signal received by the wireless transmitting and receiving unit 302, (ii) determines whether or not the wireless transmitting and receiving unit 302 is receiving the video signal, (iii) causes the dummy signal generating unit 907 to generate a dummy signal having the format specified with the format information stored in the storage unit 905 in the case where the wireless transmitting and receiving unit 302 is not receiving the video signal, and (iv) provide the generated dummy signal to the video device 102.

As described above, the wireless communications system 100 according to Embodiment 2 provides dummy signals via the wired connection when the wireless connection is disconnected. Since the dummy signals eliminate the need for starting the display setting and the signal synchronization over again when the wireless connection is reestablished, the display setting and the signal resynchronization process may be omitted when once-broken wireless connection is resumed.

It is noted that in Embodiments 1 and 2, DRAMs are used for the storage units 204, 305, and 905. Examples of the storage units used in the present invention, however, shall not be limited to DRAMs. Instead of DRAMs, faster memory devices such as Static Random Access Memories (SRAMs) may be used as the storage units. Furthermore, the use of non-volatile memory devices as the storage units makes a faster connection possible once the power is reactivated on the adapter device.

Figure 13:
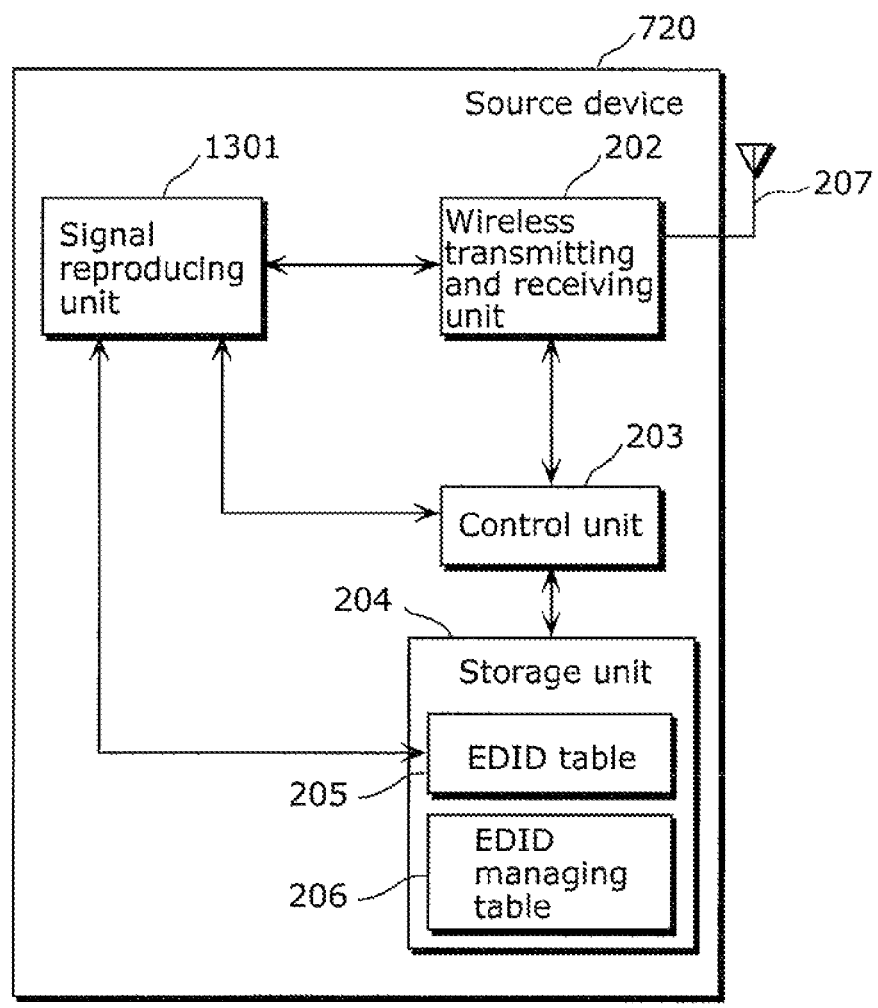
FIG. 13 is a block diagram exemplifying a structure of a source device in the present invention.
Figure 14:
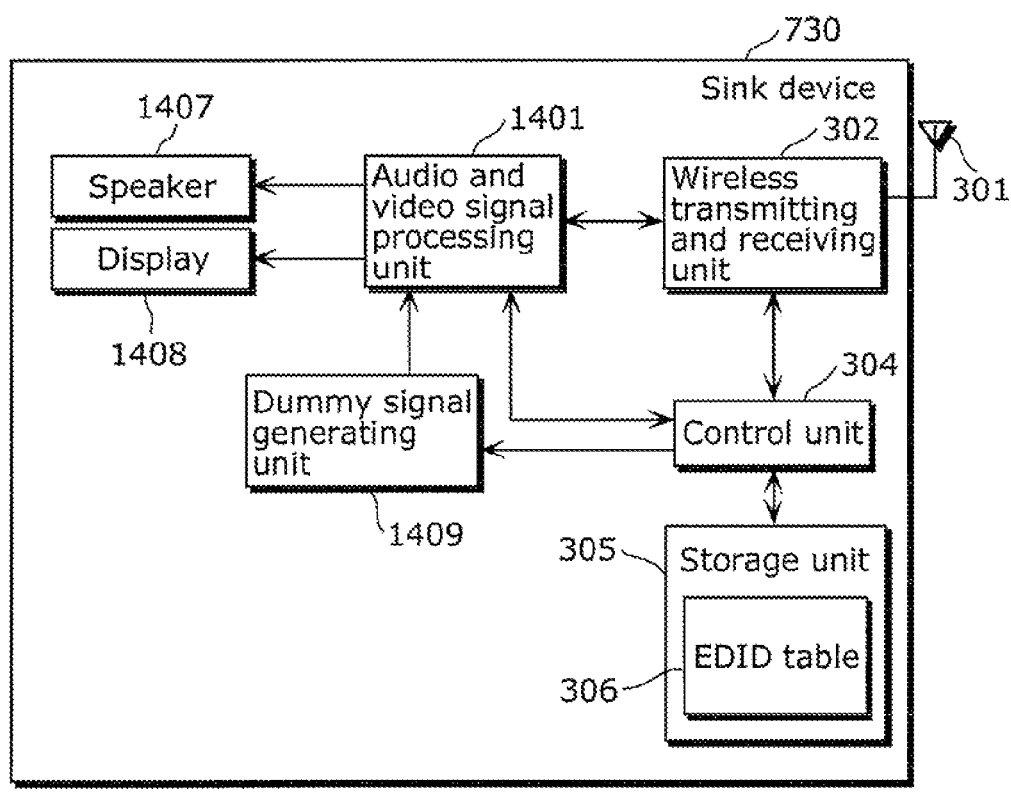
FIG. 14 is a block diagram exemplifying a structure of a sink device in the present invention.
Figure 15:
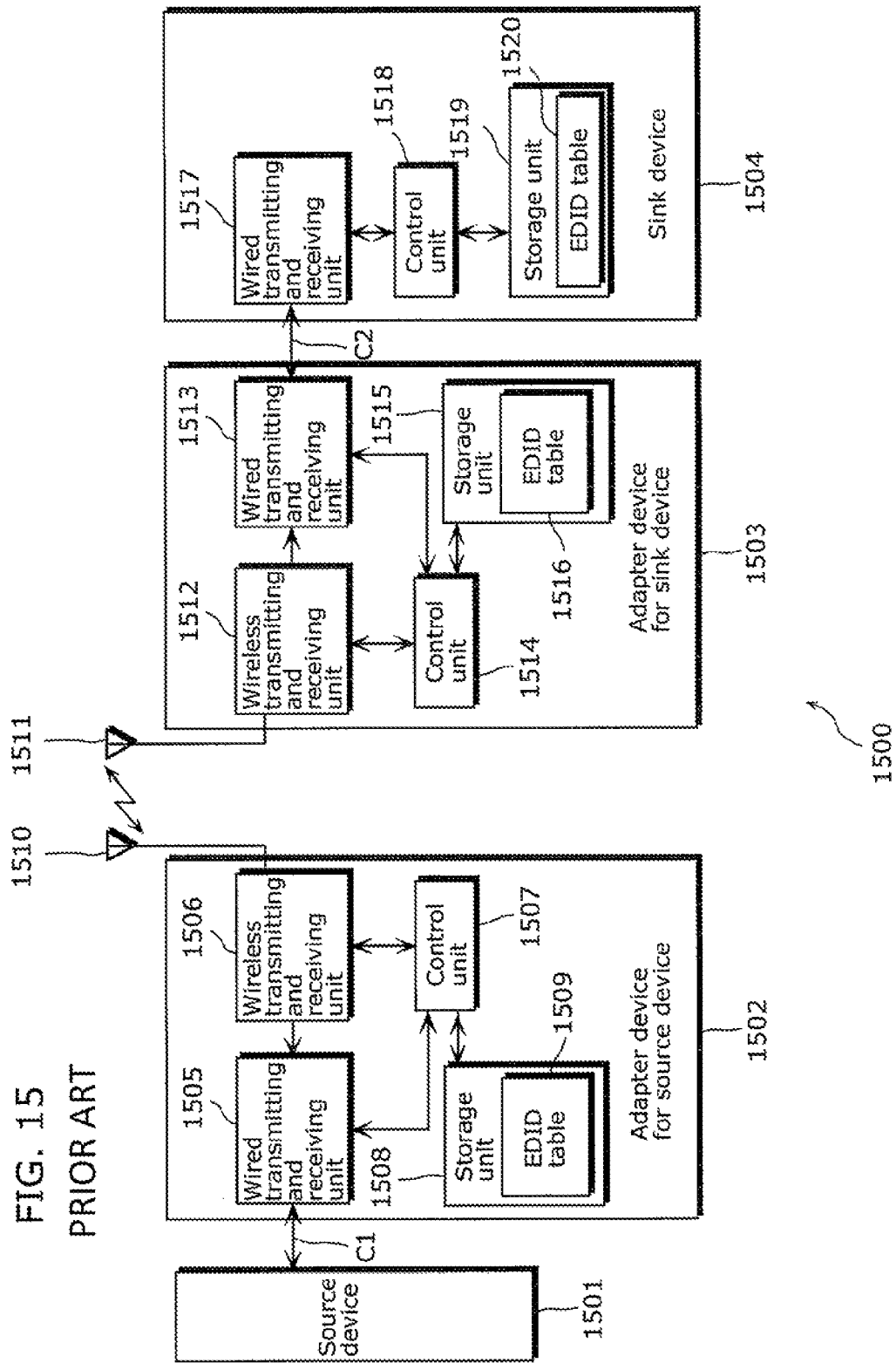
FIG. 15 is a block diagram showing a structure of a conventional wireless communications system.

As a modification of Embodiments 1 and 2, the source device may also execute the functions of the adapter device for the source device. This allows the source device to execute the control performed in the present invention without connecting to the adapter device for the source device. Similarly, the sink device may also execute the functions of the adapter device for the sink device. FIG. 13 exemplifies a structure of a source device 720 according to a modification of Embodiment 1. FIG. 14 exemplifies a structure of a sink device 730 according to a modification of Embodiment 2.

As FIG. 13 shows, the source device 720 includes, for example, a signal reproducing unit 1301, such as a DVD player, instead of the wired transmitting and receiving unit 201 included in the adapter device for the source device. FIG. 14 shows that, instead of the wired transmitting and receiving unit 303, such as a TV, in the adapter device for the sink device, the sink device 730 may include an audio and video signal processing unit 1401, a speaker 1407, and, as a displaying unit, a display 1408. Here the audio and video signal processing unit 1401 processes both of audio and video signals. Furthermore, the sink device 730 may include a dummy signal generating unit 1409.

In other words, the wireless communications system 100 includes a video device (the source device) 720 which wirelessly transmits a video signal; and a video device (the sink device) 730 which receives the wirelessly-transmitted video signal, and displays the received video signal. The video device 720 may include: a storage unit 204; a wireless transmitting and receiving unit 202; and a control unit 203.

When wirelessly transmitting the video signal to the video device 730, the control unit 203

(i) in the case where setting information is stored in the storage unit 204, (a) obtains the setting information from the storage unit 204, and (b) causes the wireless transmitting and receiving unit 202 to wirelessly transmit a video signal which is compliant with the obtained setting information, the setting information indicating specifications of video displayable on the video device 730, and (ii) in the case where setting information is not stored in the storage unit 204, (a) obtains the setting information from the video device 730, (b) causes the wireless transmitting and receiving unit 202 to wirelessly transmit a video signal which is compliant with the obtained setting information, and (c) stores the setting information in the storage unit 204.

In addition, the video device 730 includes: the wireless transmitting and receiving unit 302, and a control unit 304 which wirelessly transmits, to the video device 720, the setting information.

It is noted that when the control unit 304 included in the adapter device for the sink device according to Embodiments 1 and 2 determines that the HDMI cable connecting the sink device has been unplugged once and plugged again, the control unit 304 may discard the EDID information held in the EDID table 306, and read the EDID information from the sink device again to update the EDID table 306.

More specifically, the control unit 304 included in the adapter device for the sink device 105 detects the Hot Plug Detect (HPD) signal of the HDMI in Hi goes Lo once and goes Hi again, so that the control unit 304 can determine that the HDMI cable connecting the sink device 102 has been unplugged once and plugged again.

Hence, even though the sink device connected to the adapter device for the sink device 105 is, for example, switched from the sink device 102 to the sink device 103, the adapter device for the sink device 105 insures that the EDID information of the currently connected sink device is held in the EDID table 306 of the adapter device for the sink device 105 itself.

Moreover, in the case where the control unit 304 included in the adapter device for the sink device 105 determines that the HDMI cable connecting the sink device 102 has been unplugged once and plugged again, the adapter device for the source device 104 may discard the EDID information which corresponds to the device ID of the adapter device for the sink device 105 and is held in the EDID managing table 206.

Instead of simply discarding the EDID information, the adapter device for the source device 104 may (i) obtain the latest EDID information read again from the sink device to which the adapter device for the sink device 105 is currently connecting, and, using the obtained latest EDID information, (ii) update the EDID information which corresponds to the device ID of the adapter device for the sink device 105 and held in the EDID managing table 206.

This operation insures that the EDID information held in the EDID managing table 206 of the adapter device for the source device is the most recent one.

In addition, the adoption of the Wireless High Definition (HD) standard for wirelessly connecting the adapter device for the source device to the adapter device for the sink device makes possible simultaneously using a wireless channel for the High-Rate PHY (HRP) to be used for transmitting and receiving the AV signal, and a wireless channel for the Low-Rate PHY (LRP) to be used for transmitting and receiving the control signal.

When the source device 101 transmits the AV signal to the Sink device 102, for example, the adapter device for the source device 104 and the adapter device for the sink device 105 may be connected with each other through the wireless channel for the HRP, and the adapter device for the source device 104 and the adapter device for the sink device 106 may be connected with each other through the wireless channel for the LRP.

In other words, the wireless communications system 100 further includes a video device (the sink device) 103; and an adapter device, for the video device, (the adapter device for the sink device) 106 which receives the video signal and causes the video device 103 to display the received video signal. The adapter device for the video device 104 and the adapter device for the video device 105 are connected to each other via a wireless channel for transmitting and receiving a video signal. The adapter device for the video device 104 and the adapter device for the video device 106 are connected to each other via a wireless channel having a slower transmission speed than the channel has.

Moreover, the adapter device for, said video device 106 includes: (i) the wireless transmitting and receiving unit 302; and a control unit 304 which (i) detects that the control unit 304 and the video device 103 are re-connected after the control unit 304 has been disconnected from the video device 103, (ii) obtains setting information from the video device 103, and (iii) wirelessly transmits a control signal to the adapter device for the video device 104 via the wireless channel, the setting information indicating specifications of video displayable on the video device 103, and the control signal including the obtained setting information and identification information which uniquely corresponds to the video device 103.

Here, upon receiving the control signal, the control unit 203 included in the adapter device for the video device 104 stores the identification information and the setting information in the storage unit 204 in association with each other.

The control unit 304 wirelessly transmits the control signal to the adapter device for the video device 104 via the wireless channel while the control unit 203 is wirelessly transmitting the video signal to the adapter device for the video device 105 via the wireless channel.

Thus suppose the case where (1) the control unit 304 included in the adapter device for the sink device 106 detects that the HDMI cable connecting the sink device 103 has been unplugged once and then plugged again, and, as described above, (2) the adapter device for the sink device 106 obtains again the EDID information from the currently connected sink device, and updates the EDID information held in the EDID table 306. Hence (3) the adapter device for the sink device 106 can transmit, to the adapter device for the source device 104, the control signal requesting the correction of the EDID managing table 206 held in the adapter device for the source device 104 while the adapter device for the source device 104 transmits the AV signal to the adapter device for the sink device 105.

For example, the control signal requesting the correction includes the device ID of the adapter device for the sink device 106, and requests the adapter device for the source device 104 to discard the EDID information corresponding to the device ID out of the EDID managing table 206. In addition to the device ID of the adapter device for the sink device 106, the control signal may include the EDID information obtained from the sink device by the adapter device for the sink device 106 after the HDMI cable has been plugged again. Furthermore, the control signal may request the adapter device for the source device 104 to replace the EDID information held in the EDID managing table 206 and corresponding to the device ID with the EDID information included in the control signal.

The adapter device for the source device 104 updates the EDID managing table 206 according to the control signal received via the wireless channel for the LRP. Thus the adapter device for the source device 104 can update the corresponding relationship between the device ID and the EDID information held in the EDID managing table 206 to the most recent corresponding relationship.

It is noted that the HDMI is employed as the communications standard for the AV signal in Embodiments 1, 2, and Modifications thereof; however, communications standards other than the HDMI or the communications standards for transmitting and receiving uncompressed image signals and audio signals may achieve similar effects.

It is noted that the simultaneously used wireless channels are not necessarily the ones for the HRP and the LRP in the Wireless HD. Any given wireless channels may be acceptable as far as the channels are capable of transmitting and receiving the control signal including the EDID information while simultaneously transmitting and receiving the video signal. Specifically, a multiplexing technique (for example, the frequency-division multiplexing, the time-division multiplexing, the space-division multiplexing, and the code-division multiplexing) used for any given wireless communications may be employed to establish virtually multiple wireless communications channels between the adapter device for the source device and two or more adapter devices for the sink device. Moreover, two communications lines; namely the wired line and the wireless line, may also be used.

Each of the processing units included in the wireless communications system 100 according to Embodiments 1 and 2 may typically be implemented in a form of a Large Scale Integrated circuit (LSI). Each unit may be formed in a single chip. Some or all of the units are formed in a single chip.

The LSI may also be referred to as an integrated circuit (IC), a system LSI, a super LSI, and an ultra LSI, depending on the integration density.

Instead of the use of the LSI for the integration of the processing units, a dedicated circuit or a general purpose processor may be used for the integration. In addition, the following may be employed for an implementation of the present invention: the Field Programmable Gate Array (FPGA) which is programmable after building the LSI, and the reconfigurable processor which allows a circuit cell in the LSI to be reconnected and reconfigured.

In the case where the advancement of the semiconductor technology or another derivative technology thereof introduces and a new circuit integrating technique which will replace the LSI, the new technology may be employed as a matter of course to integrate the functional blocks.

Furthermore, some or all of the functions of the wireless communications system 100 according to Embodiments 1 and 2 of the present invention may be implemented by a processor, such as the Central Processing Unit (CPU), executing a program.

Moreover, the present invention may be introduced in a form of the above program and a storage medium on which the above program is stored. As a matter of course, such a program may be distributed via a transmission media including the Internet.

In addition, the functions of the wireless communications system 100 according to Embodiments 1 and 2 and the modifications thereof may partially or entirely be combined to implement the present invention.

Moreover, all the numbers shown above are mare examples to specifically describe the present invention. Therefore, the present invention may take any given number. The logic levels represented in Hi and Lo are mere examples to specifically describe the present invention. A different combination of the exemplified logic levels may also lead to a similar result.

The relation of the connection between the constituent features is a mare example to specifically describe the present invention. Hence the relation of the connection shall not be limited to this for implementing the functions of the present invention.

The above Embodiments are structured with hardware and or software. The structure with the hardware may be implemented with the software, and vice versa.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

A sink device, a source device, an adapter device for the sink device, an adapter device for the source device, and a wireless communications system, and a control method thereof in the present invention are applicable to an AV system including a DVD player and a TV.

REFERENCE SIGNS LIST 101, 720, and 1501 Source device
102, 103, 730, and 1504 Sink device
104 and 1502 Adapter device for a source device
105, 106, and 1503 Adapter device for a sink device
107, 108, and 109 Cable
201, 303, 1505, 1513, and 1517 Wired transmitting and receiving unit
202, 302, 1506, and 1512 Wireless transmitting and receiving unit
203, 304, 904, 1507, 1514, and 1518 Control unit
204, 305, 905, 1508, 1515, and 1519 Storage unit
205, 306, 1509, 1516, and 1520 EDID table
206 EDID managing table
207, 301, 1510, and 1511 Antenna 907 and 1409 Dummy signal generating unit
908 Format information table
1301 Signal reproducing unit
1401 Audio and video signal processing unit
1407 Speaker
1408 Display

The invention claimed is:

1. A wireless communications system comprising:
a first video device which provides a video signal;
an adapter device, for said first video device, which is connected to said first video device and wirelessly transmits the video signal;
a second video device; and
an adapter device, for said second video device, which (i) receives the wirelessly-transmitted video signal, and (ii) provides the received video signal to said second video device,
wherein said adapter device for said first video device includes:
a first storage unit;
a wireless transmitting and receiving unit; and
a first control unit,
when said first control unit wirelessly transmits the video signal to said second video device, said first control unit is configured to,
(i) in the case where first setting information is stored in said first storage unit, (a) obtain the first setting information from said first storage unit, (b) transmit the obtained first setting information to said first video device, (c) receive from said first video device a video signal which is compliant with the first setting information, and (d) cause said wireless transmitting and receiving unit to wirelessly transmit the received video signal, the first setting information indicating specifications of video displayable on said second video device, and
(ii) in the case where first setting information is not stored in said first storage unit, (a) obtain the first setting information from said adapter device for said second video device, (b) transmit the obtained first setting information to said first video device, (c) receive from said first video device a video signal which is compliant with the first setting information, and (d) cause said wireless transmitting and receiving unit to wirelessly transmit the received video signal, and (e) store the first setting information in said first storage unit, and
said adapter device for said second video device includes:
a wireless transmitting and receiving unit; and
a second control unit configured to wirelessly transmit, to said adapter device for said first video device, the first setting information being obtained from said second video device.

2. The wireless communications system according to claim 1, further comprising
a third video device; and an adapter device, for said third video device, which receives the video signal and causes said third video device to display the received video signal,
wherein said adapter device for said first video device and said adapter device for said second video device are connected to each other via a first wireless channel for transmitting and receiving the video signal,
said adapter device for said first video device and said adapter device for said third video device are connected to each other via a second wireless channel having a slower transmission speed than the first channel has,
said adapter device for said third video device includes:
a wireless transmitting and receiving unit; and
a third control unit configured to (i) detect that said third control unit and said third video device are re-connected after said third control unit has been disconnected from said third video device, (ii) obtain second setting information from said third video device, and (iii) wirelessly transmit a control signal to said adapter device for said first video device via the second wireless channel, the second setting information indicating specifications of video displayable on said third video device, and the control signal including the obtained second setting information and identification information which uniquely corresponds to said third video device, and
upon receiving the control signal, said first control unit is configured to store the identification information and the second setting information in said first storage unit in association with each other.

3. The wireless communications system according to claim 2,
wherein said third control unit is configured to wirelessly transmit the control signal to said adapter device for said first video device via the second wireless channel while said first control unit is wirelessly transmitting the video signal to said adapter device for said second video device via the first wireless channel.

4. The wireless communications system according to claim 2,
wherein the identification information is uniquely assigned to said adapter device for said third video device.

5. The wireless communications system according to claim 2,
wherein the identification information is uniquely assigned to said third video device.

6. The adapter device for said first video device according to claim 1.

7. The adapter device for said second video device according to claim 1.

8. A wireless communications system comprising:
a first video device which wirelessly transmits a video signal; and
a second video device which receives the wirelessly-transmitted video signal, and displays the received video signal,
wherein said first video device includes:
a first storage unit;
a wireless transmitting and receiving unit; and
a first control unit,
when said first control unit wirelessly transmits the video signal to said second video device,
said first control unit is configured to,
(i) in the case where first setting information is stored in said first storage unit, (a) obtain the first setting information from said first storage unit, and (b) cause said wireless transmitting and receiving unit to wirelessly transmit a video signal which is compliant with the obtained first setting information, the first setting information indicating specifications of video displayable on said second video device, and
(ii) in the case where first setting information is not stored in said first storage unit, (a) obtain the first setting information from said second video device, (b) cause said wireless transmitting and receiving unit to wirelessly transmit a video signal which is compliant with the obtained first setting information, and (c) store the first setting information in said first storage unit, and
said second video device includes:
a wireless transmitting and receiving unit; and a second control unit configured to wirelessly transmit, to said first video device, the first setting information.

9. The first video device according to claim 8.

10. The second video device according to claim 8.

11. The wireless communications system according to claim 1,
wherein said adapter device for said second video device further includes:
a dummy signal generating unit configured to generate a dummy signal which is a dummy video signal having a format corresponding to a format of the video signal; and
a second storage unit,
wherein said second control unit is configured to (i) store format information, in said second storage unit, which specifies a format of the video signal received by said wireless transmitting and receiving unit, (ii) determine whether or not said wireless transmitting and receiving unit is receiving the video signal, (iii) cause said dummy signal generating unit to generate a dummy signal having the format specified with the format information stored in said second storage unit in the case where said wireless transmitting and receiving unit is not receiving the video signal, and (iv) provide the generated dummy signal to said second video device.

12. A method for controlling a wireless communications system which includes: a first video device which provides a video signal; an adapter device, for the first video device, which is connected to the first video device and wirelessly transmits the video signal; a second video device; and an adapter device, for the second video device, which (i) receives the wirelessly-transmitted video signal, and (ii) provides the received video signal to the second video device,
wherein when the adapter device for the first video device wirelessly transmits the video signal to the second video device, the adapter device for the first video device,
(i) in the case where first setting information is stored in a first storage unit, (a) obtains the first setting information from the first storage unit, (b) transmits the obtained first setting information to the first video device, (c) receives from the first video device a video signal which is compliant with the first setting information, and (d) causes a wireless transmitting and receiving unit to wirelessly transmit the received video signal, the first setting information indicating specifications of video displayable on the second video device, and
(ii) in the case where first setting information is not stored in the first storage unit, (a) obtains the first setting information from the adapter device for the second video device, (b) transmits the obtained first setting information to the first video device, (c) receives from the first video device a video signal which is compliant with the first setting information, and (d) causes the wireless transmitting and receiving unit to wirelessly transmit the received video signal, and (e) stores the first setting information in the first storage unit, and
the adapter device for the second video device wirelessly transmits, to the adapter device for the first video device, the first setting information obtained from the second video device.

13. A method for controlling a wireless communications system which includes: a first video device which wirelessly transmits a video signal; and a second video device which receives the wirelessly-transmitted video signal, and displays the received video signal,
wherein, when the first video device wirelessly transmits the video signal to the second video device, the first video device,
(i) in the case where first setting information is stored in a first storage unit, (a) obtains the first setting information from the first storage unit, and (b) causes a wireless transmitting and receiving unit to wirelessly transmit a video signal which is compliant with the obtained first setting information, the first setting information indicating specifications of video displayable on the second video device, and
(ii) in the case where first setting information is not stored in the first storage unit, (a) obtains the first setting information from the second video device, (b) causes the wireless transmitting and receiving unit to wirelessly transmit a video signal which is compliant with the obtained first setting information, and (c) stores the first setting information in the first storage unit, and
the second video device wirelessly transmits, to the first video device, the first setting information.

14. A wireless communications system comprising:
a first video device which provides a video signal;
an adapter device, for said first video device, which is connected to said first video device and wirelessly transmits the video signal;
a second video device; and
an adapter device, for said second video device, which (i) receives the wirelessly-transmitted video signal, and (ii) provides the received video signal to said second video device,
wherein said adapter device for the said second video device includes:
a wireless transmitting and receiving unit;
a dummy signal generating unit configured to generate a dummy signal which is a dummy video signal having a format corresponding to a format of the video signal;
a first storage unit; and
a first control unit configured to (i) store format information, in said first storage unit, which specifies a format of the video signal received by said wireless transmitting and receiving unit, (ii) determine whether or not said wireless transmitting and receiving unit is receiving the video signal, (iii) cause said dummy signal generating unit to generate a dummy signal having the format specified with the format information stored in said first storage unit in the case where the wireless transmitting and receiving unit is not receiving the video signal, and (iv) provide the generated dummy signal to said second video device.

15. The adapter device for said second video device according to claim 14.

16. A wireless communications system comprising:
a first video device which wirelessly transmits a video signal; and
a second video device which receives the wirelessly-transmitted video signal, and displays the received video signal,
wherein said second video device includes:
a wireless transmitting and receiving unit;
a dummy signal generating unit configured to generate a dummy signal which is a dummy video signal having a format corresponding to a format of the video signal;
a first storage unit; and
a first control unit configured to (i) store format information, in said first storage unit, which specifies a format of the video signal received by said wireless transmitting and receiving unit, (ii) determine whether or not said wireless transmitting and receiving unit is receiving the video signal, (iii) cause said dummy signal generating unit to generate a dummy signal having the format specified with the format information stored in said first storage unit in the case where the wireless transmitting and receiving unit is not receiving the video signal, and (iv) provide the generated dummy signal to a display unit within said second video device.

17. The second video device according to claim 16.

18. A method for controlling a wireless communications system which includes: a first video device which provides a video signal; an adapter device, for the first video device, which is connected to the first video device and wirelessly transmits the video signal; a second video device; and an adapter device, for the second video device, which (i) receives the wirelessly-transmitted video signal, and (ii) provides the received video signal to the second video device,
  wherein the adapter device for the second video device generates a dummy signal which is a dummy video signal having a format corresponding to a format of the video signal; and
  the adapter device for the second video device (i) stores format information, in a first storage unit, which specifies a format of a video signal received by a wireless transmitting and receiving unit, (ii) determines whether or not the wireless transmitting and receiving unit is receiving the video signal, (iii) causes a dummy signal generating unit to generate a dummy signal having the format specified with the format information stored in the first storage unit in the case where the wireless transmitting and receiving unit is not receiving the video signal, and (iv) provides the generated dummy signal to the second video device.

19. A method for controlling a wireless communications system which includes: a first video device which wirelessly transmits a video signal; and a second video device which receives the wirelessly-transmitted video signal, and displays the received video signal,
  wherein the second video device generates a dummy signal which is a dummy video signal having a format corresponding to a format of the video signal; and
  the second video device (i) stores format information, in a first storage unit, which specifies a format of a video signal received by a wireless transmitting and receiving unit, (ii) determines whether or not the wireless transmitting and receiving unit is receiving the video signal, (iii) causes a dummy signal generating unit to generate a dummy signal having the format specified with the format information stored in the first storage unit in the case where the wireless transmitting and receiving unit is not receiving the video signal, and (iv) provides the generated dummy signal to a display unit within the second video device.

\* \* \* \* \*